United States Patent
Zhi et al.

(10) Patent No.: US 11,387,456 B2
(45) Date of Patent: Jul. 12, 2022

(54) ENERGY STORAGE DEVICE AND A METHOD OF PREPARING THE DEVICE

(71) Applicant: City University of Hong Kong, Kowloon (HK)

(72) Inventors: Chunyi Zhi, Shatin (HK); Xinliang Li, Kowloon Tong (HK); Qi Yang, Kowloon (HK); Longtao Ma, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/420,251

(22) Filed: May 23, 2019

(65) Prior Publication Data
US 2020/0373577 A1 Nov. 26, 2020

(51) Int. Cl.
| | | |
|---|---|---|
| H01M 4/583 | (2010.01) | |
| H01M 4/42 | (2006.01) | |
| H01M 4/36 | (2006.01) | |
| H01M 4/48 | (2010.01) | |
| H01M 10/38 | (2006.01) | |
| H01M 4/02 | (2006.01) | |

(52) U.S. Cl.
CPC .......... *H01M 4/583* (2013.01); *H01M 4/366* (2013.01); *H01M 4/42* (2013.01); *H01M 4/48* (2013.01); *H01M 10/38* (2013.01); *H01M 2004/021* (2013.01); *H01M 2220/30* (2013.01); *H01M 2300/0002* (2013.01)

(58) Field of Classification Search
CPC .......... H01M 4/583; H01M 4/42; H01M 4/36; H01M 4/48; H01M 10/38
See application file for complete search history.

(56) References Cited

U.S. PATENT DOCUMENTS

| | | | | |
|---|---|---|---|---|
| 5,885,733 A | * | 3/1999 | Ohsawa | H01M 10/0566 429/309 |
| 2005/0003271 A1 | * | 1/2005 | Jiang | H01M 12/06 429/229 |
| 2010/0285375 A1 | * | 11/2010 | Friesen | H01M 12/06 429/405 |
| 2016/0301078 A1 | * | 10/2016 | Zhamu | H01M 50/431 |

(Continued)

FOREIGN PATENT DOCUMENTS

| | | |
|---|---|---|
| CN | 104530311 | 5/2016 |
| WO | 2016106171 | 6/2016 |

OTHER PUBLICATIONS

M. Song, et al, "Recent Advances in Zn-Ion Batteries", Advanced Functional Materials, 2018, 28, 1802564.

(Continued)

*Primary Examiner* — Kenneth J Douyette
(74) *Attorney, Agent, or Firm* — Renner Kenner Greive Bobak Taylor & Weber

(57) ABSTRACT

An energy storage device includes a cathode including an active material with a material structure of MXenes, wherein the active material includes at least one electrochemically active component; and a gelatin-based electrolyte containing an aqueous electrolytic solution disposed adjacent to the electrode. The aqueous electrolytic solution is arranged to facilitate a physical and/or a chemical transformation of at least a portion of the active material upon an operation cycle of charging and discharging of the energy storage device.

23 Claims, 25 Drawing Sheets

(56) References Cited

U.S. PATENT DOCUMENTS

2016/0301096 A1* 10/2016 Zhamu .............. H01M 10/0568
2017/0207492 A1* 7/2017 Adams .................. H01M 4/661
2018/0166662 A1* 6/2018 Zhi ........................ H01G 11/80
2018/0269537 A1* 9/2018 Yoshima ............... H01M 10/36

OTHER PUBLICATIONS

H. Li, et al, "An extremely safe and wearable solid-state zinc ion battery based on a hierarchical structured polymer electrolyte", Energy & Environmental Science, 2018, 11, 941-951.

H. Pan, et al "Reversible aqueous zinc/manganese oxide energy storage from conversion reactions", Nature Energy, 2016, 1, 16039.

Sun, J.-Y., et al, "Highly stretchable and tough hydrogels", Nature 2012, 489, 133-136.

Luo, F., et al, "Oppositely Charged Polyelectrolytes Form Tough, Self-Healing, and Rebuildable Hydrogels", Advanced Materials, 2015, 27, 2722-2727.

* cited by examiner

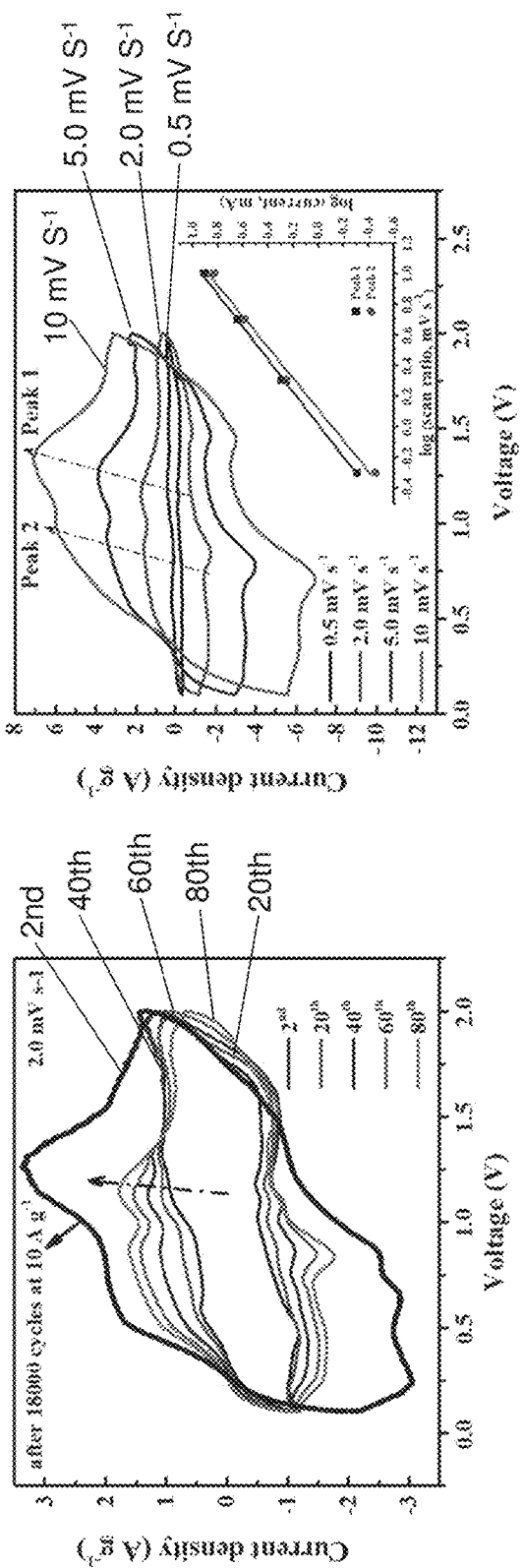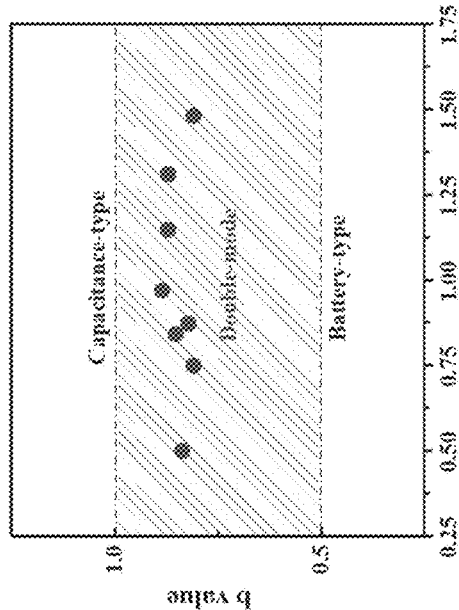
Fig. 10A
Fig. 10B
Fig. 10C

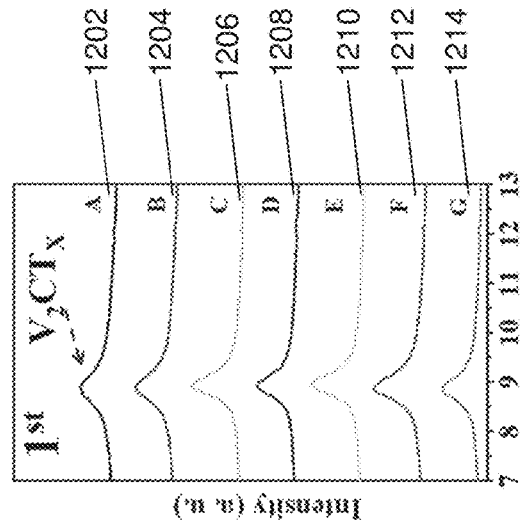
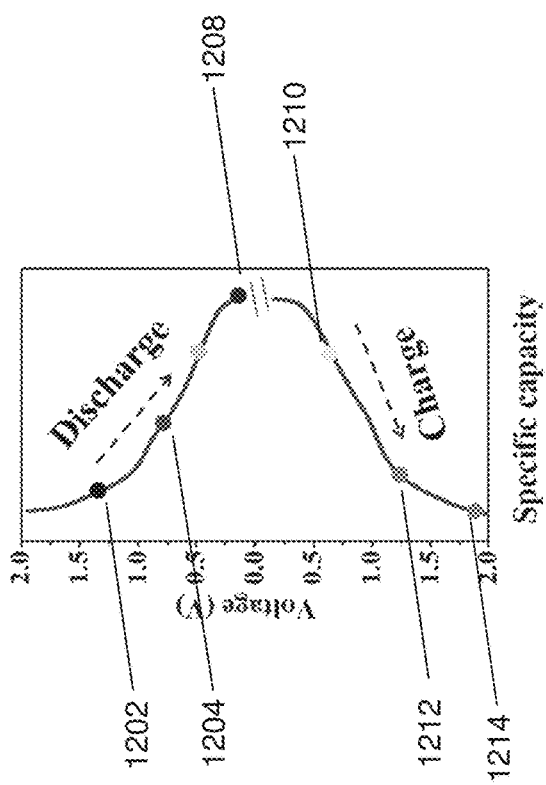
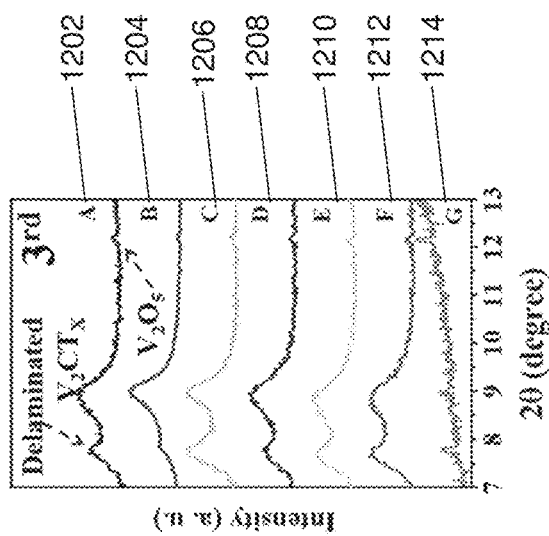
Fig. 12A
Fig. 12B
Fig. 12C

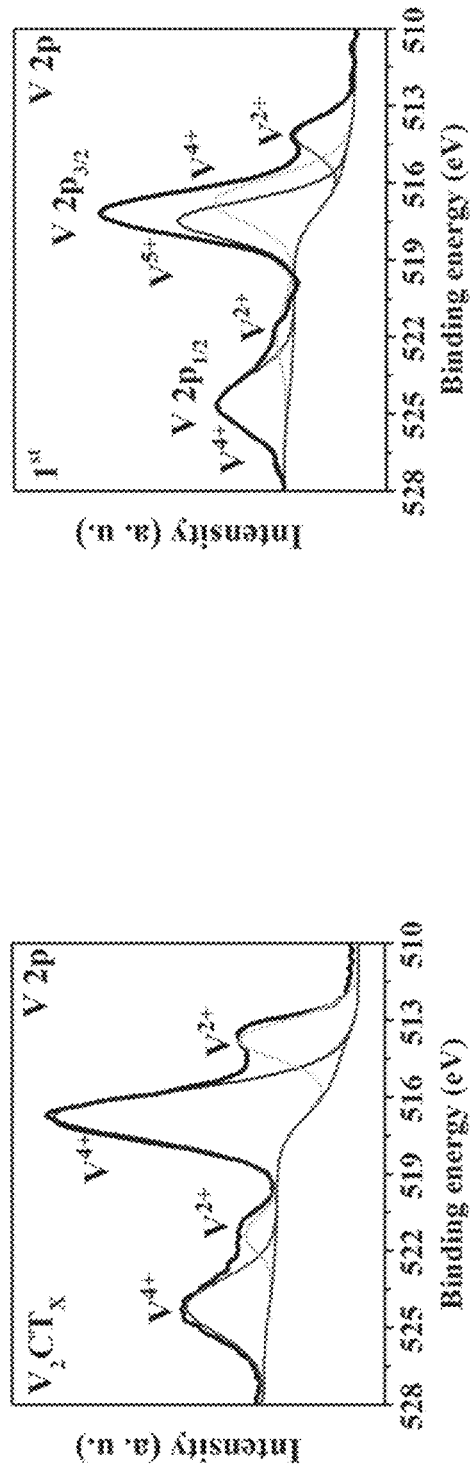
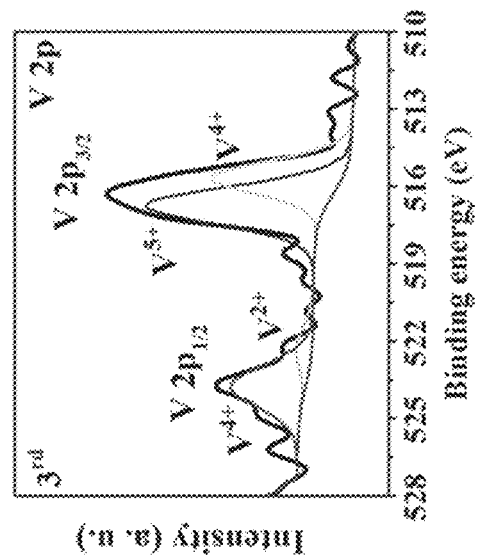
Fig. 14A  Fig. 14B  Fig. 14C

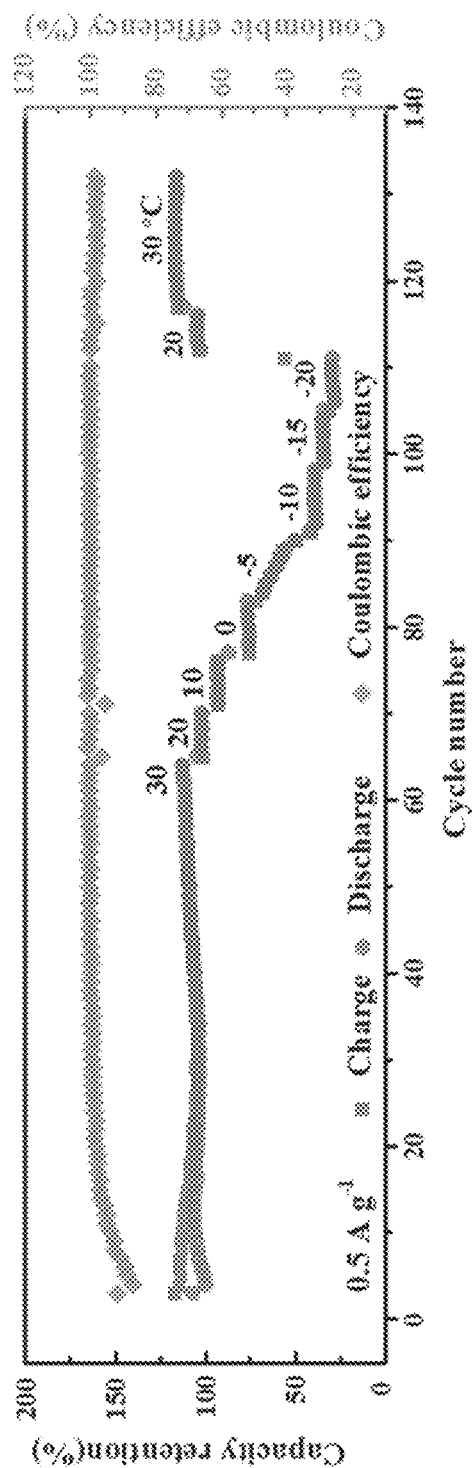
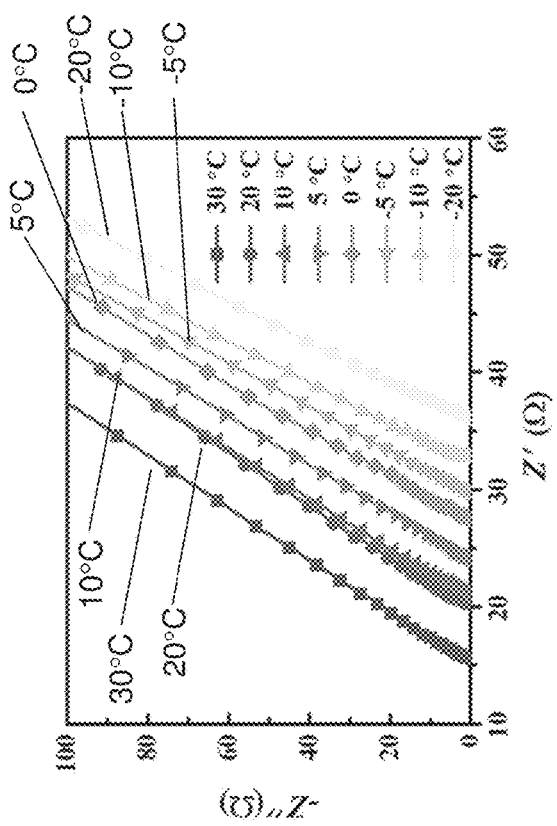
Fig. 22A
Fig. 22B

ENERGY STORAGE DEVICE AND A METHOD OF PREPARING THE DEVICE

TECHNICAL FIELD

The present invention relates to an energy storage device and a method of preparing the same, in particular, but not exclusively, to a flexible battery.

BACKGROUND

Flexible and wearable devices are growing in use and are starting to become more mainstream. Flexible and wearable devices are being incorporated into wearable products that are also starting to become more popular and are starting to gain a wider usage.

A wearable energy source is a requirement for any wearable device. Wearable energy source devices have attracted tremendous attention due to the rapid development of wearable electronics. Examples of wearable power source may include supercapacitors or some particular batteries.

SUMMARY OF THE INVENTION

In accordance with the first aspect of the present invention, there is provided an energy storage device, comprising: a cathode including an active material with a material structure of MXenes, wherein the active material includes at least one electrochemically active component; and a gelatin-based electrolyte containing an aqueous electrolytic solution disposed adjacent to the electrode; wherein the aqueous electrolytic solution is arranged to facilitate a physical and/or a chemical transformation of at least a portion of the active material upon an operation cycle of charging and discharging of the energy storage device.

In an embodiment of the first aspect, the MXenes material structure is arranged to include a plurality of active sites upon the operation cycle of charging and discharging of the energy storage device.

In an embodiment of the first aspect, the MXenes material structure is arranged to undergo a structural change upon an ion insertion into interlayer spacings of the MXenes material structure.

In an embodiment of the first aspect, the MXenes structure is arranged to undergo delamination, forming a plurality layers of the active material providing an increased number of active sites, thereby facilitating further ion insertion.

In an embodiment of the first aspect, the ions inserted into the interlayer spacings of the MXenes material structure include ions of the aqueous electrolytic solution.

In an embodiment of the first aspect, the aqueous electrolytic solution includes a high concentration salt solution, wherein the salt solution contains at least one ion of $Li^+$, $Na^+$, $Ca^{2+}$, $Mg^{2+}$, $Zn^{2+}$, $Al^{3+}$, or $Fe^{2+}$.

In an embodiment of the first aspect, the MXenes material structure is further arranged to undergo a phase transition thereby at least partially forming an oxide of the active material.

In an embodiment of the first aspect, the oxide of the active material includes $V_2O_5$.

In an embodiment of the first aspect, the MXenes material structure is further arranged to undergo a phase transition thereby at least partially forming carbon phases of the active material.

In an embodiment of the first aspect, the at least one electrochemical active component includes vanadium carbides.

In an embodiment of the first aspect, the active material includes a vanadium carbide MXenes having a plurality layers of $V_2CT_x$ formed by the vanadium carbides and a plurality of surface terminal functional groups.

In an embodiment of the first aspect, the high concentration salt solution is arranged to prevent dissolution of the active material, thereby maintaining the structure of the active material for the physical and/or a chemical transformation.

In an embodiment of the first aspect, the concentration of the at least one ion is 1-21M.

In an embodiment of the first aspect, the device further includes a zinc anode.

In an embodiment of the first aspect, the gelatin-based electrolyte is arranged to physically deform upon subjecting to an external mechanical force applied onto the electrolyte.

In an embodiment of the first aspect, the gelatin-based electrolyte is arranged to be operable under water and/or a low temperature condition.

In an embodiment of the first aspect, the gelatin-based electrolyte is arranged to maintain its mechanical properties after subjecting an open-air environment for a predetermined of time.

In an embodiment of the first aspect, the gelatin-based electrolyte includes a hydrogel of polyacrylamide.

In accordance with the second aspect of the present invention, there is provided a method of preparing an energy storage device, comprising the steps of: providing a zinc anode; providing a cathode including an active material with a material structure of MXenes, wherein the active material includes at least one electrochemically active component; providing a gelatin-based electrolyte containing an aqueous electrolytic solution disposed adjacent to the electrodes; and sandwiching the gelatin-based electrolyte between the anode and the cathode; wherein the aqueous electrolytic solution is arranged to facilitate a physical and/or a chemical transformation of at least a portion of the active material upon an operation cycle of charging and discharging of the energy storage device.

In an embodiment of the second aspect, the step of providing a zinc anode includes the step of electrodepositing a zinc metal onto a substrate.

In an embodiment of the second aspect, the step of providing a cathode including the steps of: chemically etching a precursor of the active material at room temperature or an elevated temperature for a predetermined time period to obtain the active material; forming a slurry of the active material; and depositing a layer of the slurry on a substrate.

In an embodiment of the second aspect, the precursor material of the active material includes a precursor of $V_2CT_x$.

In an embodiment of the second aspect, the substrate is selected from the group consisting of carbon nanotube paper, carbon cloth, carbon paper, nickel foam, stainless steel and their combination.

In an embodiment of the second aspect, the step of providing a gelatin-based electrolyte includes the steps of: forming a mixture of a gel monomer, an initiator and a crosslinking agent in an aqueous electrolytic solution; and curing the mixture at room temperature or a higher temperature.

In an embodiment of the second aspect, the gel monomer is provided with an amount of 2 wt % to 50 wt % based on a total amount of the gelatin-based electrolyte.

In an embodiment of the second aspect, the initiator is provided with an amount of 0.1 wt % to 10 wt % based on a total amount of the gelatin-based electrolyte.

In an embodiment of the second aspect, the crosslinking agent is provided with an amount of 0.002 wt % to 0.2 wt % based on a total amount of the gelatin-based electrolyte.

In an embodiment of the second aspect, the aqueous electrolytic solution includes a salt solution having at least one ion with a concentration of 1-21 M.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 10A is a plot of current density against voltage showing the in-situ cyclic voltammetry (CV) curves of the $V_2CT_x$-based ZIB of FIG. 6A at a scan rate of 2 mV s$^{-1}$.

FIG. 10B is a plot of current density against voltage showing the in-situ CV curves of the $V_2CT_x$-based ZIB of FIG. 6A at different scan rates ranging from 0.5-10 mV s$^{-1}$. The insert is a plot of log(i) vs log(v) showing the corresponding fitting curves of Peak 1 and Peak 2 in the CV curves.

FIG. 10C is a plot of b value against voltage of the $V_2CT_x$-based ZIB of FIG. 6A.

FIG. 12A is a plot of voltage against specific capacity showing the discharge/charge curves of the $V_2CT_x$ cathode at the 3rd cycle at 0.1 A g$^{-1}$. The $V_2CT_x$ cathode is in the state of being charged to 0.2 V.

FIG. 12B is a plot showing the XRD patterns of the $V_2CT_x$ cathode after the 1st cycle at 0.1 A g$^{-1}$. The $V_2CT_x$ cathode is in the state of being charged to 0.2 V.

FIG. 12C is a plot showing the XRD patterns of the $V_2CT_x$ cathode after the 3rd cycle at 0.1 A g$^{-1}$. The $V_2CT_x$ cathode is in the state of being charged to 0.2 V.

FIG. 14A is a plot showing the XPS V 2p patterns of the $V_2CT_x$ cathode before cycling. The $V_2CT_x$ cathode is in the state of being charged to 0.2 V.

FIG. 14B is a plot showing the XPS V 2p patterns of the $V_2CT_x$ cathode after the 1st cycle at 0.1 A g$^{-1}$. The $V_2CT_x$ cathode is in the state of being charged to 0.2 V.

FIG. 14C is a plot showing the XPS V 2p patterns of the $V_2CT_x$ cathode after the 3rd cycle at 0.1 A g$^{-1}$. The $V_2CT_x$ cathode is in the state of being charged to 0.2 V.

FIG. 22A is a plot showing the specific capacity and Coulombic efficiency of the Zn—$V_2CT_x$ battery of FIG. 18 at different temperature, ranging from −20 to 30° C.

FIG. 22B is a plot showing the ion conductivity of the PAM-based electrolyte at different temperature, ranging from −20° C. to 30° C.

DETAILED DESCRIPTION OF THE PREFERRED EMBODIMENTS

Figure 1:
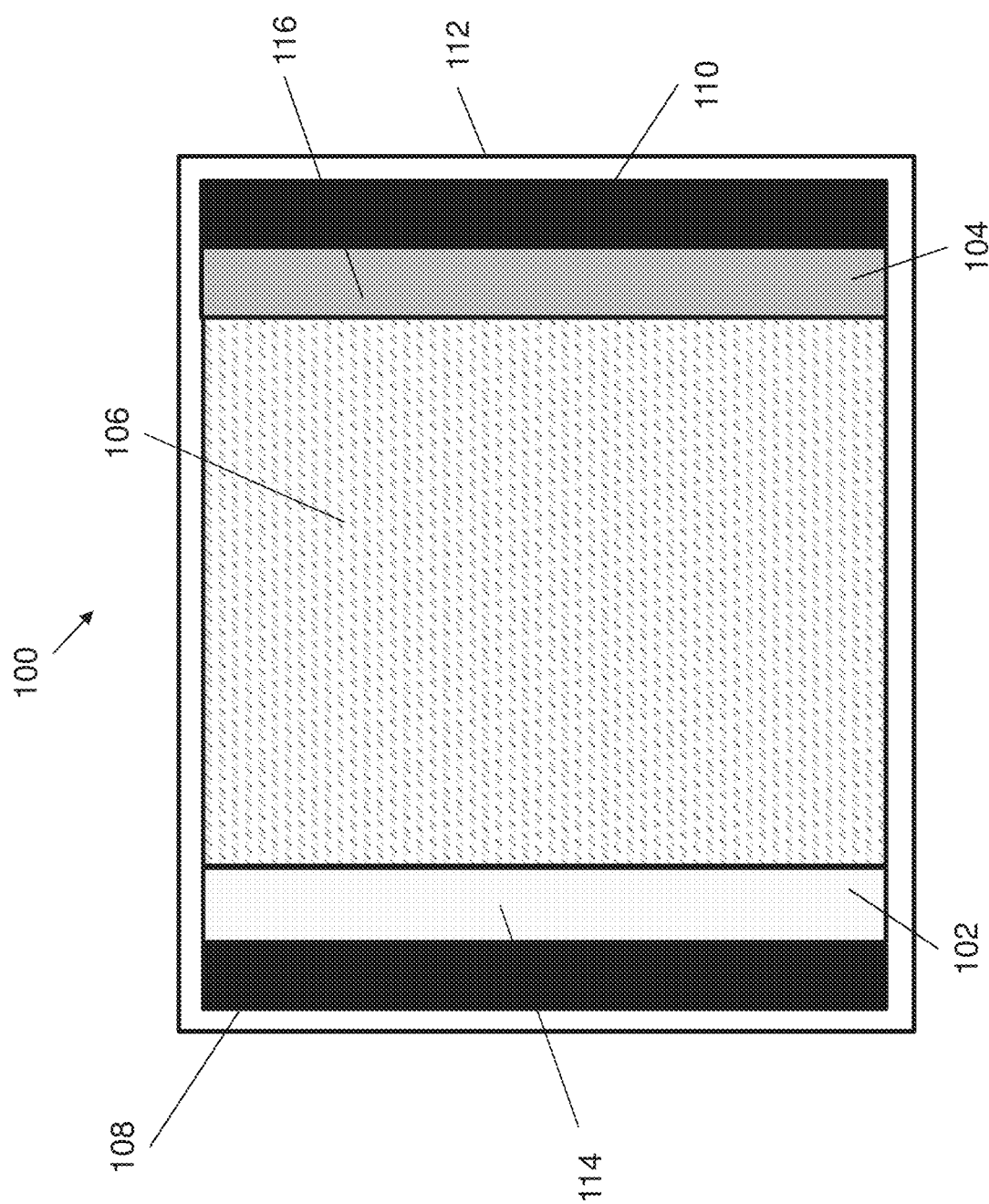
FIG. 1 illustrates of an energy storage device in accordance with an embodiment of the present invention.

The inventors have, through their own research, trials and experiments, devised that flexible electronics may be used in a variety of applications in healthcare, military, and other applications. For example, flexible electronics may be used in wearable electronic device components and devices (i.e. wearable electronics), which may include smart fabric materials in the wearable electronics. Preferably, devices including garments made with smart fabrics may be used in a variety of applications such as healthcare to replace bulky instruments and bulky electronic components.

One example of an energy storage device for flexible/wearable electronics is zinc-ion battery (ZIB) which may include advantages such as having much less toxic and flammable materials therein as compared with lithium-ion batteries, therefore may have much less safety and/or health concern to users. ZIB may also be low cost for scaling up as a result of the water-free and/or oxygen-free environment for assembling the battery. In addition, ZIB may have a high specific capacity as a result of multiple electron transfer and a low redox potential of $Zn^{2+}/Zn$.

It is appreciated that nowadays many of the flexible and wearable devices are intended to design for multipurpose. That is, by using one device, a user may experience multi-function therefrom. For example, a user may use a multi-functional electronic device for streaming a video or music while he/she is sending an email as well as monitoring his/her heart or pulse rate. In addition, the device may be simultaneously running other background applications during the aforementioned operations. Thus, an energy storage device having a sufficiently large capacity may be required to meet such demanding operation requirements.

The inventors have, through their own research, trials, and experiments, devised that the capacity as well as cycling performance of a battery may be correlated to the stability of the cathode. For example, during the cyclic processes, ions from the electrolyte may be repeatedly inserted into and/or extracted from the cathode, leading to a structural and/or phase transition of the cathode. Such repeated ion insertion and/or extraction may generate by-products affecting the cycling performance and capacity of the batteries.

On the one hand, when the by-products are of low or no electrochemical activity, they may not be able to contribute to capacity but they may consume the active cathode material and therefore deteriorating the cathode eventually the battery performance. On the other hand, when the by-products are electrochemically active or even more active than the cathode material, they may enhance the battery performance in an uncontrollable manner and therefore reducing the battery life (i.e. durability).

Besides, it is appreciated that human bodies and organs are soft, curved, and constantly moving, flexible and wearable devices will therefore experience various mechanical forces during routine use, including forces from, for example, stretching, folding, hitting, shearing etc. The device sometimes may even experience accidentally cutting and/or scratching during use. In other words, it is inevitable for the device to experience different deformation and damages during routine usage or long-term usage. Furthermore, one desirable feature of a flexible/wearable electronic device may be weather resistant. That is, the device may be operated under harsh environments. For example, it may be desirable for a smart watch being operable under water during diving or being operable in a cold environment with a temperature of ice or even lower.

Accordingly, it may be preferable to provide an energy storage device with a high capacity, stable cycling performance as well as being operable with stable electrochemical performance under different deformations and harsh environment conditions.

In accordance with an example embodiment of the present invention, there is provided an energy storage device with a high capacity and prolonged cycling performance. The device may have a specific capacity of 508 mAh $g^{-1}$ and cycling performance of at least 18000 cycles. The device may also be capable of physically deforming upon subjecting to an external mechanical load; as well as capable of operable under harsh environmental conditions. The device may include a pair of electrodes and a gelatin-based electrolyte containing an aqueous electrolytic solution. Preferably, the aqueous electrolytic solution may facilitate the electrochemical performance of the cathode upon an operation cycle of charging and discharging of the energy storage device. The aqueous electrolytic solution may also be arranged to facilitate the weather resistance of the device.

With reference to FIG. 1, there is shown an exemplary embodiment of an energy storage device 100. The energy storage device 100 may be of any form that can capture energy produced at one time for use at a later time. In this example, the energy storage device is a battery, in particular a rechargeable battery. The battery 100 may be of any suitable form that fits a particular application, such as flat-shaped, fiber-shaped, twisted fiber-shaped, coin-shaped, ball-shaped etc. Regardless of the shape of the battery, the battery may substantially have an increased capacity and long lasting cycling performance. The battery may also be substantially resistant to external mechanical force and harsh environmental conditions while the electrochemical performance of the battery is maintained.

In this embodiment, the battery 100 comprises an electrode 102 and an electrode 104 being spaced apart from each other and an electrolyte 106 disposed between the electrodes 102, 104. The electrolyte 106 is sandwiched between and is electrically coupled with the electrodes 102, 104. The electrodes 102, 104 may function as an anode and a cathode, respectively or vice versa.

Optionally or additionally, the battery 100 may also include substrates 108, 110 which may provide mechanical supports to the electrode 102 and/or the electrode 104. The substrates may also operate as a current collector to associate with the electrodes 102, 104, respectively. For example, the substrates may be electrically conductive and may be bonded to external electrical wires to deliver electrical energy to external electronic devices.

The battery 100 may optionally include an encapsulation 112 that receives and encases the electrodes 102, 104 and the electrolyte 106. The encapsulation 112 may be formed in any suitable shape such as for example a cylinder or a planar shape or any other suitable shape. The encapsulation 112 may be formed from a suitable material such as epoxy or a polymer.

In one example embodiment, the electrode 102 functions as an anode and the electrode 104 functions as a cathode of the battery 100. In operation there is a charge transfer between the anode 102 and the cathode 104 in order to convert chemical energy to electrical energy. The anode 102 and the cathode 104 are preferably being flexible. The anode 102 and cathode 104 are arranged in a suitable arrangement depending on the desired shape of the battery 100.

With reference to FIG. 1, the anode 102 comprises a substrate 108 with a metal or metal compound 114 disposed on the substrate 108. The substrate 108 may be of any suitable material. In one example the substrate 108 is a carbon cloth. Alternatively the substrate 108 may be selected from carbon nanotube (CNT) paper, carbon paper, nickel/copper alloy cloth or steel sheet. The substrate 108 may have some electrical conductance but is preferably robust enough to function within an electrolyte.

The anode 102 preferably comprises zinc. In one example, the anode may be a zinc sheet, particularly a zinc nanosheet 114 that is electrodeposited onto carbon cloth 108. The carbon cloth 108 provides a base layer for the zinc to be deposited onto. The carbon cloth 108 may also have a rough surface with intertwined structures which in turn facilitating the deposition of materials thereon. The zinc is deposited to form a substantially thick layer of zinc 114. The thickness may depend on the operational life of the battery 100.

In one example, the electrodeposited zinc may be highly crystalline and uniformly cover the entire surface of the carbon cloth. In particular, the electrodeposited zinc may have a highly porous architecture comprising interconnected nanoflakes. For example, the nanoflakes may be uniformly and vertically arranged on the carbon cloth forming a laminated structure. This may be advantageous as the nanocrystalline and porous structure may reduce ion diffusion path which in turn facilitating electrolyte penetration as well as charge/ion transport.

Alternatively the anode 102 may comprise a ribbon or a sheet of zinc metal. That is, the anode 102 may not include an additional substrate 108 and may include a piece of zinc metal. The zinc metal may be a flexible ribbon or a flexible sheet of zinc metal. The zinc metal is arranged in a suitable configuration based on the desired shape of the battery 100, or the anode may comprises zinc being deposited or electroplated on other types of substrates such as metal sheet include nickel and or copper.

The cathode 104 comprises a substrate 110 with an active material 116 disposed on the substrate. In one example, the substrate 110 may be in similar construction to the anode substrate 108. That is, the substrate 110 comprises a carbon cloth. Alternatively the substrate may be a CNT paper, carbon paper, nickel/copper alloy cloth or steel sheet.

The active material 116 comprises a material with a material structure of MXenes, including at least one electrochemically active component. Preferably, the active material 116 may include at least one electrochemically active component of metal carbides or metal carbide compounds. The metal carbides or metal carbide compounds may form a plurality of layers defining the MXenes structure. In one example, the at least one electrochemically active component may include vanadium carbides. The vanadium carbides may include a plurality of surface terminal functional groups which together may form a plurality layers of $V_2CT_x$ defining a vanadium carbide MXenes structure.

Preferably, at least portion of the active material 116 (i.e. the vanadium carbide MXenes structure) may undergo a physical and/or a chemical transformation during an operation cycle of charging and discharging of the battery 100. As such, it may facilitate the cathode to retain more metal or metal ions after each charging/discharging cycle and therefore facilitating the battery to have an increased capacity. Detailed structural arrangement of the active material and the transformation mechanism will be discussed in the later part of this disclosure.

The electrolyte 106 may be an aqueous electrolytic solution being disposed/contained the encapsulation 112 and the anode 102 and the cathode 104 are positioned within the electrolyte. In particular, the aqueous electrolytic solution may include a high concentration salt solution containing at least one ion of $Li^+$, $Na^+$, $Ca^{2+}$, $Mg^{2+}$, $Zn^{2+}$, $Al^{3+}$, or $Fe^{2+}$. In one example, the aqueous electrolyte solution may contain $Li^+$ and $Zn^{2+}$ with a concentration of 1-21 M. Advantageously, the high concentration salt solution may facilitate the physical and/or chemical transformation of the active material 116. For example, the high concentration salt solution may contain a relatively low water content such that the active material may be prevented from dissolution by water during the operation cycle of charging and discharging. Thus, the layered MXenes structure of the active material may be stabilized and maintained for the physical and/or chemical transformation. A skilled person may recognize any other electrolytic solutions including suitable salts or ions according to their needs.

Alternatively, the electrolyte 106 may be a polymeric electrolyte such as a gelatin-based electrolyte disposed between the anode 102 and the cathode 104. The gelatin-based electrolyte 106 may be a hydrogel electrolyte such as a hydrogel of polyacrylamide (PAM) containing an aqueous electrolytic solution particularly a high concentration salt solution containing at least one ion of $Li^+$, $Na^+$, $Ca^{2+}$, $Mg^{2+}$, $Zn^{2+}$, $Al^{3+}$, or $Fe^{2+}$. The concentration of ions in the salt solution may be of 1-21 M, more preferably 5-21 M. The hydrogel electrolyte is viscous enough to be formed into a shape and retain the shape it is formed into.

For example, the electrolyte 106 may be formed into any one of an elongated shape, a planar shape, a tubular shape, a ball shape or any suitable shape. The electrolyte 106 is also capable of being retained within the battery 100 by being sandwiched between the electrodes 102 and 104. In other words, the electrodes 102 and 104 are disposed on opposite sides of the electrolyte 106.

The electrolyte 106 may be flexible and may dissipate at least some mechanical energy when subjected to an external mechanical load applied to the battery 100, thereby allowing the battery 100 to maintain its electrochemical performance while under deformation. For example, the battery 100 may physically deform into different irregular shapes under the conditions of bending, folding, squeezing, twisting, cutting, and hammering while dissipating energy therefrom, and maintaining the electrochemical performance. In other words, the electrolyte may be capable of withstanding a certain amount of mechanical forces applied thereonto while the integrity of the electrolyte and thereby the battery is maintained.

The use of high concentration salt solution as the aqueous electrolytic solution in the gelatin-based electrolyte may be advantageous. For example, the high salt content may significantly decrease the freezing point of the gelatin-based electrolyte such that the electrolyte may be operable while under a temperature of ice or an even lower temperature (e.g. −20° C.). In addition, the high concentration of salt (i.e. high ion content) may stabilize the crosslinked network of the polymer matrix of the gelatin-based electrolyte. As such, the electrolyte may be more resistant to dissolution in water and therefore rendering the electrolyte being operable under water.

Such stabilization may further render the electrolyte more resistant to degradation upon exposing to air such that the mechanical properties of the electrolyte may be maintained. In one example, the gelatin-based electrolyte may maintain its mechanical properties such as stretchability after being exposed to an open-air environment for at least 60 days. Thus, the durability of the electrolyte and thereby the battery containing such electrolyte may be increased. The aforementioned advantages of the cathode, electrolyte, and the battery will be further illustrated in the examples discussed in the later part of this disclosure.

Figure 2:
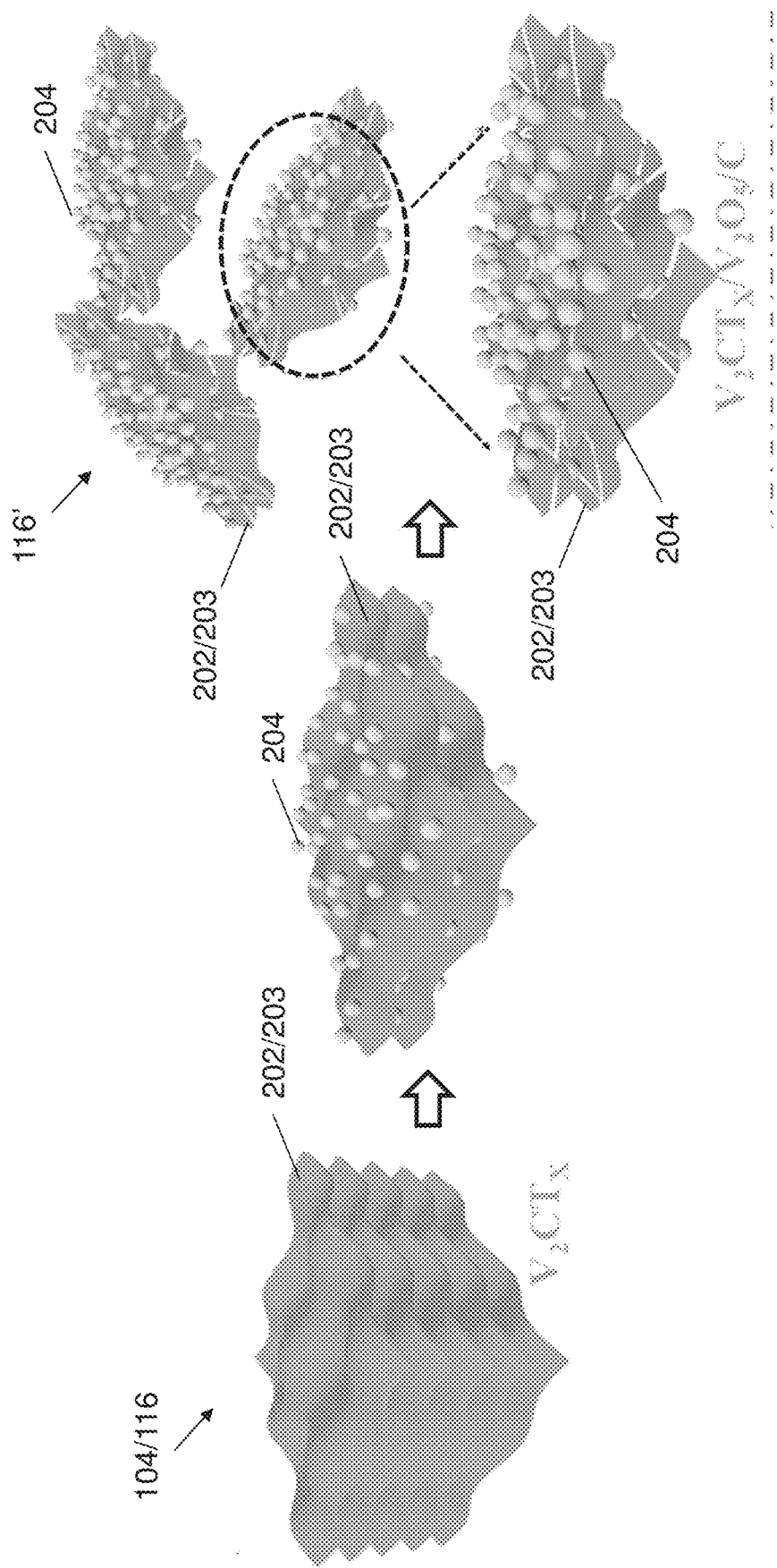
FIG. 2 illustrates the structure, structural and phase transition of the active material of an electrode of the energy storage device of FIG. 1.

With reference to FIG. 2, the cathode 104 comprises an active material 116 with a material structure of MXenes. The material structure of MXenes includes a plurality of layers of the electrochemically active component. During a charging or discharging operation of the battery, the ions/active components in the battery may interact with the active material in each of these individual layers in the layer material structure, facilitating the physical and/or chemical transformation of at least a portion of the active material so as to increase the capacity of the battery.

In this embodiment, the MXenes material structure includes a plurality of structured layers 202 overlaying with each other. Each of the structured layers 202 may include at least one electrochemically active component 203. In one example, the structured layers may include metal carbide functioning as an electrochemically active component. The metal carbide may coordinate with each other to form a two dimensional structure/layer. Each of these two dimensional structure/layer may also include a plurality of surface terminal functional groups such as $=O$, $—F$, and $—OH$, which may facilitate the coordination of the metal carbides. As such, a plurality layers of $M_{n+1}C_nT_x$ (where $M_{n+1}C_n$=metal carbides, n=1, 2 or 3; $T_x$=surface terminal function groups) overlays with each other to form the material structure of MXenes (i.e. metal carbide MXenes).

The metal carbide MXenes 116 may include a plurality of interlayer spacings for accommodating ions/active components of the battery during the operation cycle of charging and discharging. The accommodated ions/active components may interact with the layers 202 such that the layers 202 may undergo a physical and/or chemical transformation which subsequently increases the capacity of the battery. For example, at the initial cycle, ions 204 such as those from the electrolyte 106 may be inserted into the interlayer spacings between each adjacent layer 202. The insertion of ion 204 may lead to an increase in the interlayer spacing, which in turn facilitating subsequent insertion and/or extraction of the ions 204.

When the charging/discharging cycle proceeds, the interlayer spacings may increase continuously and eventually render some of the layers 202 separate from the bulk MXenes material structure 116, forming a plurality of MXenes material structure 116' with fewer layers 202. In other words, the MXenes material structure 116 undergoes delamination to form a plurality of MXenes material structure 116'. As such, each of the MXenes material structures 116' may function as an active site for subsequent ion insertion/extraction. That is, more active sites are provided for the insertion of ions 204 which in turn increasing the charge storage of the active material, thereby increasing the capacity of the battery.

Additionally or alternatively, the metal carbide layers 202 of the MXenes material structure 116/116' may be exposed to air during the charging/discharging cycles. In particular, such exposure may be facilitated by the delamination process as mentioned above. The metal element of the metal carbide may react with oxygen-containing functional groups and water molecules in the electrolyte, at least partially generating an oxide of the metal carbide (i.e. active material). That is, the MXenes material structure undergoes a phase transition from a metal carbide to a metal oxide. In this way, the valence state of the metal element of the metal carbide may increase from a low valence state (e.g. +2) to a mixture of high valance states (e.g. +3, +4, and +5) which in turn further contributing to the increase of capacity of the battery.

The process of metal oxide generation may become saturated as the cycling process further proceeds. It is appreciated that the ions from the electrolyte and/or anode may be used up after the reaction proceeds for a certain period of time. This, in turn, renders the phase transition of the MXenes material structure to metal oxide incomplete and phase transforming into carbon phases instead. In other words, the MXenes material structure eventually partially phase transforms into metal oxide and carbon phases.

Referring to FIG. 2, there is shown an example illustrating the active material 116 of the cathode 104. As mentioned, the active material 116 comprises a MXenes material structure which includes at least one electrochemically active component having a plurality layers formed by metal carbides and a plurality of surface terminal functional groups (i.e. a plurality $M_{n+1}C_nT_x$ layers). In this example, the MXenes material structure includes vanadium carbides as the electrochemically active component.

The vanadium carbides are arranged into a plurality of two dimensional layers with a plurality of surface terminal functional groups such as =O, —F, and —OH. These layers form a plurality of $V_2CT_x$ layers overlaying with each other defining the MXenes material structure. Each of the adjacent $V_2CT_x$ layers include an interlayer spacing arranged for accommodating ions/active components from the battery during the operation of charging/discharging cycle. As mentioned, such accommodation may facilitate a physical and/or chemical transformation of the material structure thereby increasing capacity of the battery during the cycling process.

For example, considering a zinc-ion battery (ZIB) including a cathode with $V_2CT_x$ as the active material. During the initial stage of the operation cycle of charging and discharging, zinc ion from the electrolyte are inserted into the interlayer spacings of the plurality layers of $V_2CT_x$, leading to an increase of the interlayer spacings. This in turn provides larger interlayer spacings and therefore facilitating subsequent zinc ion insertion and/or extraction.

As the cycling process proceeds, more and more zinc ions will be inserted into the interlayer spacings and subsequently renders some of the $V_2CT_x$ layers separate/delaminate from the bulk MXenes material structure, forming a plurality of MXenes material structures with fewer $V_2CT_x$ layers (i.e. few-layer MXene). These delaminated structures in turn provide more active sites for further zinc ion insertion, rendering the material structure storing more electrical charges as compared with the bulk material structure and therefore increasing the capacity of the battery.

In addition, the bulk material structure and/or the few-layer MXenes is exposed to air during the cycling process. In particular, it is appreciated that the few-layer MXenes may be more exposed to air as compared with the bulk structure in view of the increased surface area of the few-layer MXene. The vanadium element in the exposed layers reacts with the oxygen-containing functional groups and water molecules in the electrolyte, undergoing a phase transition to at least partially generate vanadium oxide $V_2O_5$. In this way, the valence state of the vanadium element is increased from a lower state of $V^{2+}$ to a mixture of higher valence states including $V^{3+}$, $V^{4+}$, and $V^{5+}$, which in turn storing more electrical charges and consequently contributing to the increase of capacity of the battery.

As mentioned, the generation of $V_2O_5$ may become saturated as the cycling process further proceeds. As a result of the limited supply of zinc ions from the anode and the electrolyte, or instability or failure of the anode and electrolyte, the phase transition of $V_2CT_x$ to $V_2O_5$ may be incomplete which in turn rendering the $V_2CT_x$ undergoing a phase transition of forming carbon phases. Thus, during the operation cycle of charging and discharging, the $V_2CT_x$ layers partially phase transition into $V_2O_5$ and carbon phases in addition to the aforementioned delamination.

The energy storage device of the present disclosure such as the battery 100 may be fabricated by commencing at the step of fabricating the electrodes. It may be first forming or providing a zinc anode. In one example, the zinc anode may be a zinc sheet. In another example, the zinc anode may be an anode formed by electrodepositing zinc metal onto a substrate. Preferably, the substrate is a carbon cloth. Alternatively the substrate may be selected from carbon nanotube (CNT) paper, carbon paper, nickel/copper alloy cloth or steel sheet. The electrodeposition time may depend on the thickness requirement, which may depend on the operational life of the battery.

It is appreciated that the electrodeposition may be performed by any suitable methods. For example, the electrodeposition may be a facile electrochemical deposition performed with a two-electrode setup. In operation, the substrate such as a carbon cloth may be used as a working electrode while a zinc plate may be used as both counter and reference electrodes. An aqueous solution containing for example 1 mol·L$^{-1}$ of $ZnSO_4$ may be used as the electrolyte. The electroplating may be performed at a predetermined current density (e.g. 10 mA cm$^{-2}$) for a predetermined time (e.g. 60-12000 s) using an electrochemical workstation. As such, the as-obtained zinc anode may have an effective mass loading of zinc of about 3.0-5.0 mg cm$^{-2}$.

After obtaining the zinc anode, the fabrication process may proceed to providing a cathode including an active material with a material structure of MXenes, wherein the active material includes at least one electrochemically active component. Preferably, the provision of cathode includes the steps of chemically etching a precursor of the active material at room temperature or an elevated temperature for a predetermined time period to obtain the active material; forming a slurry of the active material; and depositing a layer of the slurry on a substrate.

In one example, the cathode may be provided by chemically etching a precursor material of $V_2CT_x$ such as $V_2AlC$ MAX ceramic phase. In particular, The $V_2AlC$ MAX ceramic phase may be subjected to a wet chemical etching for 24-120 h at a temperature of 25-90° C. to obtain the active material of $V_2CT_x$ MXenes in powder form.

The as-obtained $V_2CT_x$ MXenes powder may then be further processed to form a slurry. The slurry may be formed by dissolving the powder in a solvent with a conductive material and a binder under a predetermined weight ratio. In one example, the solvent, the conductive material, and the binder may be N-methyl-2-pyrrolidone (NMP), acetylene blacks, and PVDF, respectively. After that, the as-obtained slurry may be uniformly deposited on a substrate such as a carbon cloth using a blade, and dried under vacuum.

It is appreciated that the steps of forming the anode and the cathode may be reversed (i.e. forming the cathode prior to forming the anode) or may be performed simultaneously.

The electrolyte, particularly the gelatin-based electrolyte, preferably the hydrogel electrolyte of the energy storage device may be prepared by forming a mixture of a gel monomer, an initiator and a crosslinking agent in an aqueous electrolytic solution. Preferably, the gel monomer, the initiator, and the crosslinking agent may be provided with an amount of 2 wt % to 50 wt %, 0.1 wt % to 10 wt %, and 0.002 wt % to 0.2 wt %, respectively based on a total amount of the gelatin-based electrolyte.

The aqueous electrolytic solution may be a salt solution containing at least one ion with a concentration of 1-21 M, more preferably 5-21 M. Preferably, the aqueous electrolytic solution may facilitate a physical and/or a chemical transformation of at least a portion of the active material upon an operation cycle of charging and discharging of the battery 100 as mentioned above.

The gel mixture is optionally subjected to a degas process to remove any air bubbles therein, facilitating the subsequent curing process. The mixture may be cured at room temperature or at an elevated temperature in a mold.

In one example, the hydrogel electrolyte may be polyacrylamide (PAM). The method of forming the hydrogel electrolyte may start with preparing the aqueous electrolytic solution. In particular, the aqueous electrolytic solution may be prepared by dissolving 0.029 g of LiTFSI and 0.364 g of $Zn(CF_3SO_3)_2$ in 1 mL of DI water with vigorous stirring for 12 h at 45° C., forming an aqueous electrolytic solution containing 5-21 M of LiTFSI and 0.1-3 M of $Zn(CF_3SO_3)_2$.

After that, a gel mixture was formed by adding 4 mg of ammonium persulphate (i.e. initiator), 0.13 mg of N,N'-methylenebisacrylamide (MBAA) (i.e. crosslinking agent), and 300 mg of acrylamide monomer (i.e. gel monomer) to 1.5 ml of the as-prepared aqueous electrolytic solution. The mixture was stirred for 2 h at room temperature. The mixture was then transferred into a mold such as a glass mold with designed thickness such as 1-20 mm and heated at 70-80° C. for 1.5 h to allow polymerization. The as-prepared hydrogel may be peeled off and optionally dried under room temperature or an elevated temperature.

The aforementioned in-situ polymerization process may be advantageous in that the electrolyte ions are directly entrapped within the polymer matrix during the polymerization process rather than passively diffuse into the polymer matrix after the polymerization process. In other words, the step of subjecting an as-prepared hydrogel electrolyte to an ion exchange process with an external solution is no longer required, rendering the electrolyte preparation simpler and more convenient. Such in-situ process may also ensure the polymer matrix entrapping most of the electrolyte ions.

The battery 100 may be assembled in an open air environment. In one example, the battery may be a coin cell. The cell may be assembled by disposing the aforementioned anode (e.g. Zn anode) and cathode (e.g. $V_2CT_x$ cathode) within an aqueous electrolytic solution (e.g. 1 M $LiSO_4$ and 2 M $ZnSO_4$), using a non-woven filer paper as a separator.

In another example, the battery may be a flexible battery. The battery may be assembled by sandwiching a hydrogel electrolyte (e.g. PAM) with the aforementioned anode and cathode.

The characterization and performance of embodiments of the electrode and the energy storage device containing the electrode will now be discussed. Structural and phase characterizations of the as-prepared electrodes were performed by XRD using a Bruker D2 Phaser diffractometer with Cu Kα irradiation (λ=1.54 Å. The surface morphology of these samples was characterized by an environmental scanning electron microscope (ESEM, FEI/Philips XL30). The morphology and microstructure of the samples were revealed by a JEOL-2001F field-emission TEM. Electron spectroscopy (XPS) was conducted on a Physical Electronics. PHI 5802 equipped with a monochromatic Al Kα source.

Cyclic voltammetry (CV) was conducted by an electrochemical workstation (CHI 760D). The CV curves of $Zn-V_2CT_x$ batteries were measured based on the three-electrode system, in which Zn was used as both counter and working electrodes. Electrochemical performance of the as-prepared $Zn-V_2CT_x$ battery was examined based on galvanostatic testing of CR2032-type coin cells (for aqueous $Zn—V_2CT_x$ battery) and planar thin film battery (for solid-state $Zn—V_2CT_x$ battery) in the voltage range of 0.1 V-2.0 V using a Land 2001A battery testing system at 24° C.

Figure 3:
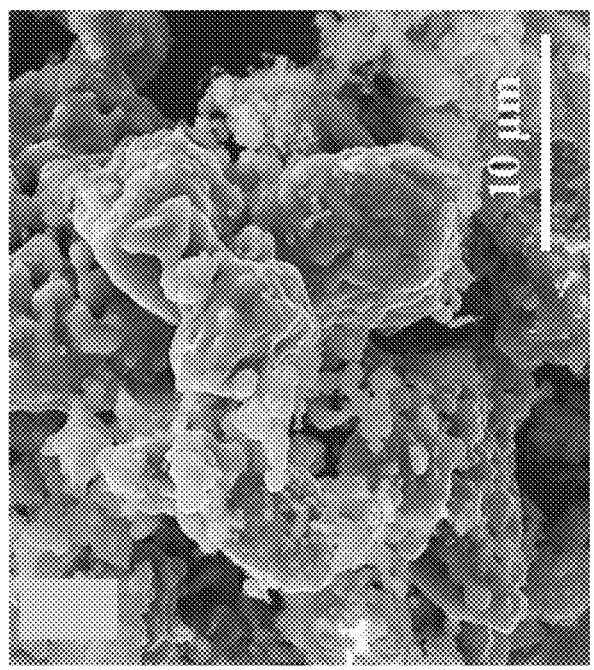
FIG. 3 is a SEM image of $V_2AlC$ MAX phase.
Figure 4B:
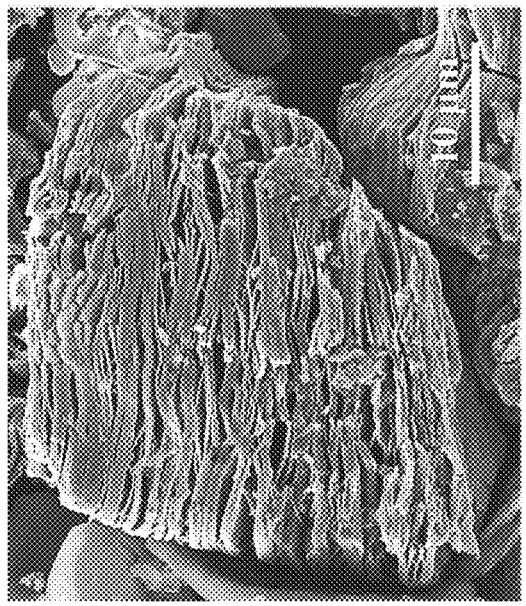
FIG. 4B is a SEM image of $V_2CT_x$ MXenes with a magnification scale of 10 μm.

The typical morphology of the initial $V_2AlC$ MAX ceramic phase before etching is illustrated in FIG. 3. As shown, the $V_2AlC$ MAX ceramic phase before etching contains rough surface and dense axial lamination. The particle size was concentrated at 10-20 μm. After etching, the microstructure changes significantly, showing an accordion-like structure similar to other MXenes. The absence of Al atoms layer results in uniform section clearance of $V_2CT_X$ as shown in FIGS. 4A and 4B. With more derails as shown in FIG. 4C, the rigid ceramic flakes become flexible and interconnect with each other. These flexible thin flakes are actually formed by stacking dozens or even hundreds of single V—C—V layers.

Figure 4D:
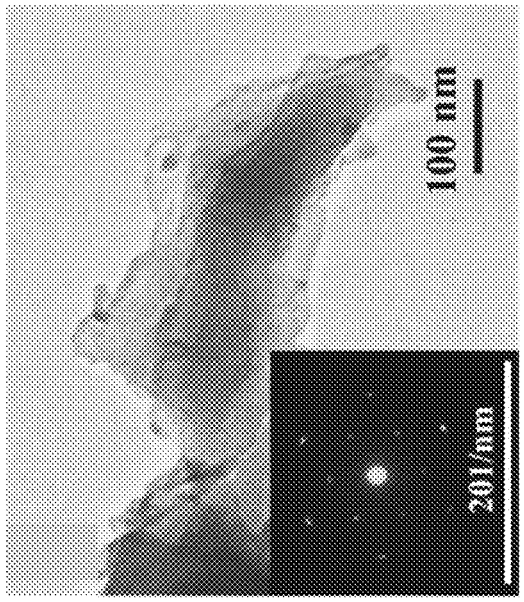
FIG. 4D is a TEM image of $V_2CT_x$ MXene. The insert is the corresponding SAED pattern of the $V_2CT_x$ MXene.
Figure 4A:
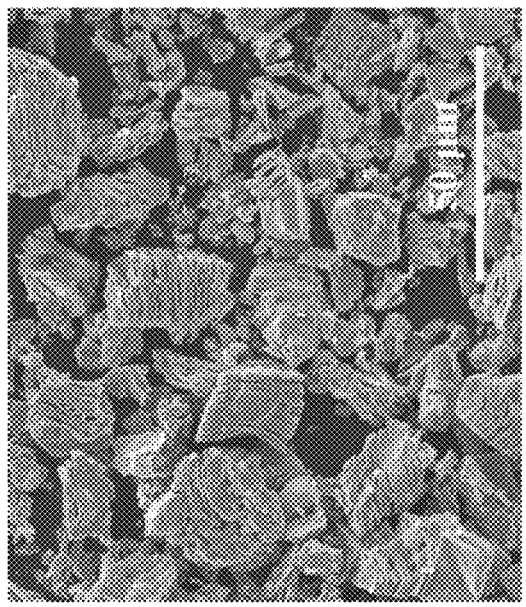
FIG. 4A is SEM image of $V_2CT_x$ MXenes with a magnification scale of 50 μm.
Figure 4C:
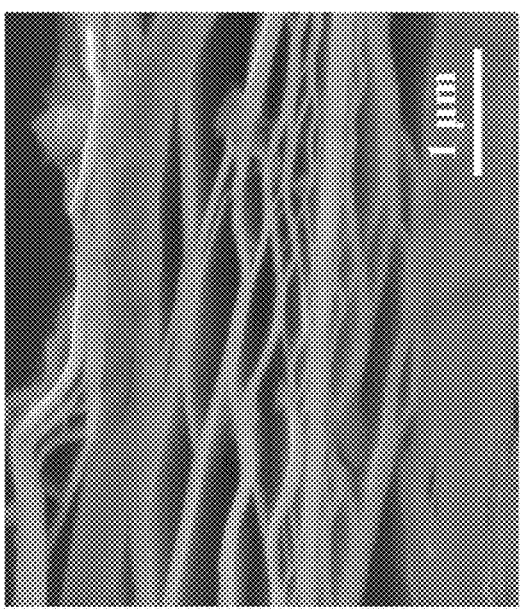
FIG. 4C is a SEM image of $V_2CT_x$ MXenes with a magnification scale of 500 nm.

TEM image of $V_2CT_X$ particles viewed from the top down as shown in FIG. 4D displays that the apparent 2D structure and electron beam transparency feature of the $V_2CT_X$ particles. Besides, through the clear edges, it can be seen that the internal layers of particles are stacked like canine teeth, consistent with FIG. 4C. The selected area electron diffraction (SAED) pattern (insert of FIG. 4E) exhibits a regular hexagonal lattice, indicating that the as-fabricated $V_2CT_X$ inherits the hexagonal crystal structure of the parent $V_2AlC$.

Figure 5:
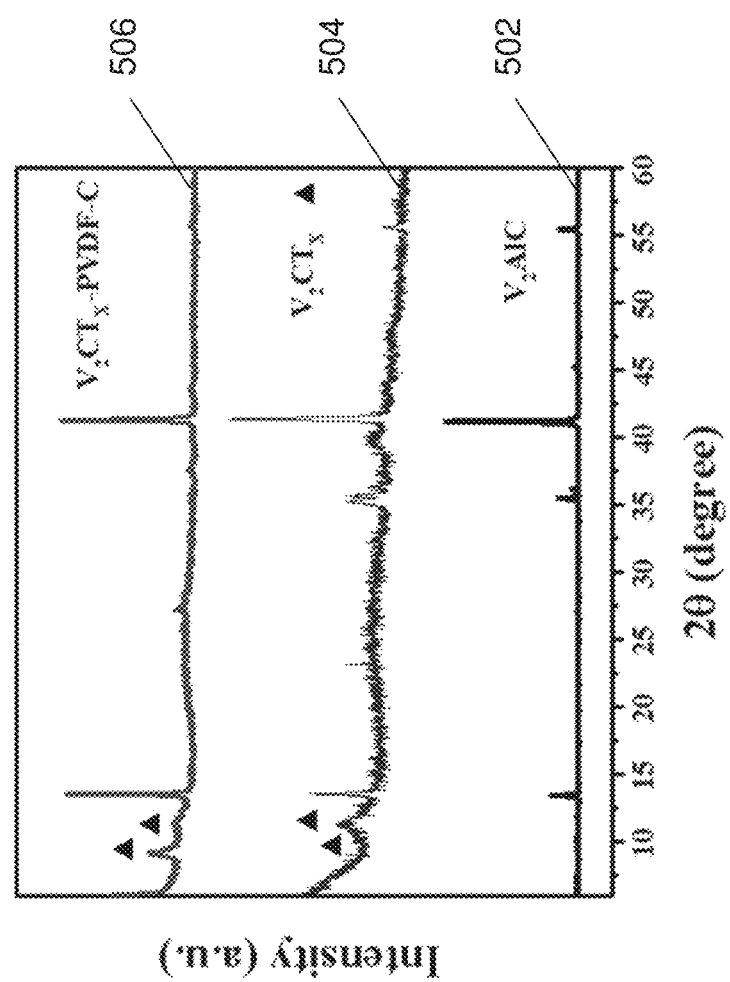
FIG. 5 is a plot showing the XRD patterns of $V_2AlC$, $V_2CT_x$, and $V_2CT_x$-based cathode.

The phase transition of the $V_2AlC$ particles before and after etching was investigated by XRD patterns. As shown in FIG. 5, all peaks in the pattern 504 match with $V_2AlC$ phase (JCPDS 29-0101) (pattern 502) well without any impurities. The two new broad peaks at 2θ=9.18° and 12.73° are characteristic diffraction peaks of $V_2CT_X$ MXenes (504) after etching. Meanwhile, the residual peaks at 2θ=13.47° and 41.27° indicate that the $V_2AlC$ phase has not been completely etched. The XRD pattern of the fabricated cathode (506) is also shown in FIG. 5. The XRD patterns are highly comparable to the raw $V_2CT_x$, indicating that the preparation process of the cathode does not affect the crystal structure of $V_2CT_X$.

Figure 6A:
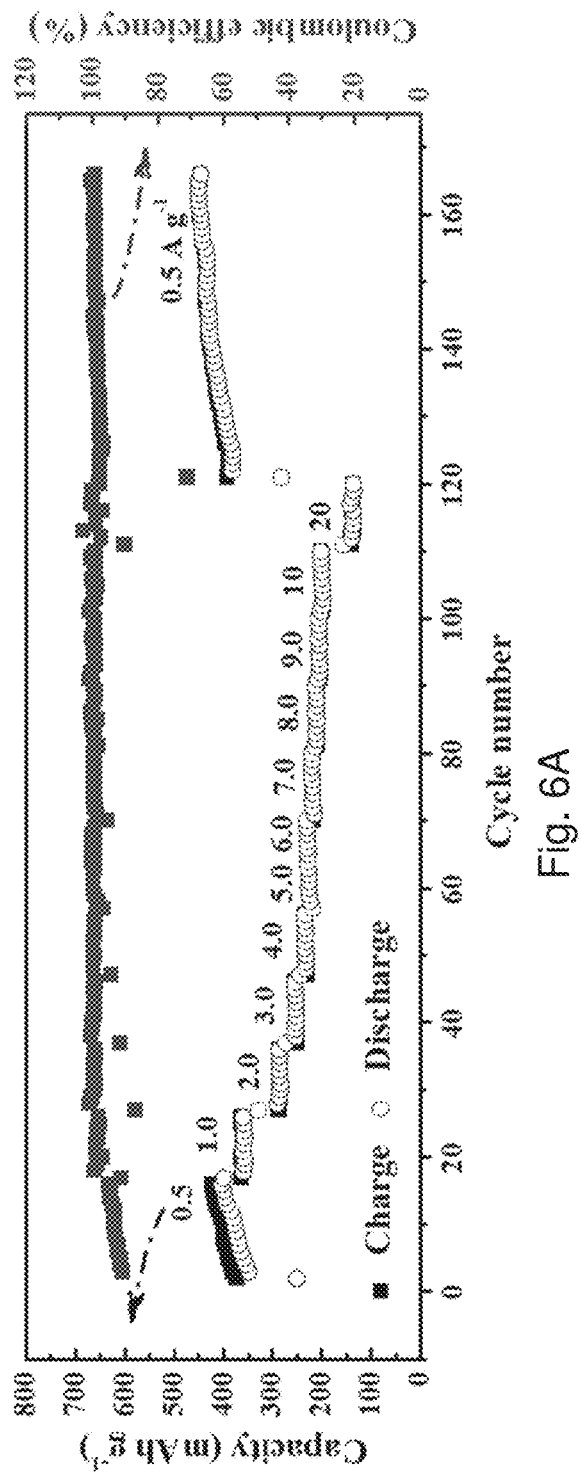
FIG. 6A is a plot showing the rate performance of the $V_2CT_x$-based ZIB in the electrolyte of LiTFSI+Zn$(CF_3SO_3)_2$ at different current densities.
Figure 6B:
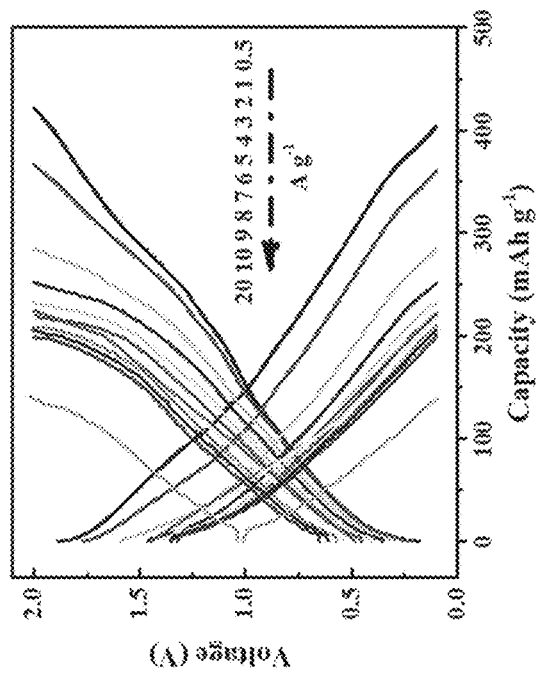
FIG. 6B is a plot of voltage against capacity showing the discharge/charge curves of the $V_2CT_x$-based ZIB of FIG. 6A.

To investigate the electrochemical performance of the as-fabricated $V_2CT_X$ cathode, a CR2032 type coin battery, which employed polished Zn plate as the anode, aqueous $LiTFSI+Zn(CF_3SO_3)_2$ solution as the electrolyte, was assembled. FIGS. 6A and 6B display the rate performance of the $V_2CT_X$ cathode at different current densities, ranging from 0.5 to 20 A $g^{-1}$, and the corresponding discharge/charge curves at voltages ranging from 0.1 V to 2.0 V, respectively.

The specific discharging capacity (based on $V_2CT_x$ mass) are up to 404.0, 360.8, 285.5, 252.8, 233.9, 228.7, 227.7, 219.6, 211.3, 205.7, 200.7, 141.8 mAh $g^{-1}$, at 0.5, 1.0, 2.0, 3.0, 4.0, 5.0, 6.0, 7.0, 8.0, 9.0, 10, 20 A $g^{-1}$, respectively (FIG. 6A). It is notable that a significant specific discharging capacity of more than 200 mAh $g^{-1}$ was achieved even at an extremely high current density of 10 A $g^{-1}$. More impressively, when the current density suddenly drops to 0.5 A $g^{-1}$, the specific capacity also immediately recovers to 382.7 mAh $g^{-1}$ and achieves 450.4 mAh $g^{-1}$ after a few cycles.

Meanwhile, the Coulombic efficiency (CE) remains close to 100% in the whole cyclic process except for a few points where the current mutation occurs. These features clearly reveal the excellent reversibility and reaction kinetics of the $V_2CT_x$ cathode.

Figure 7:
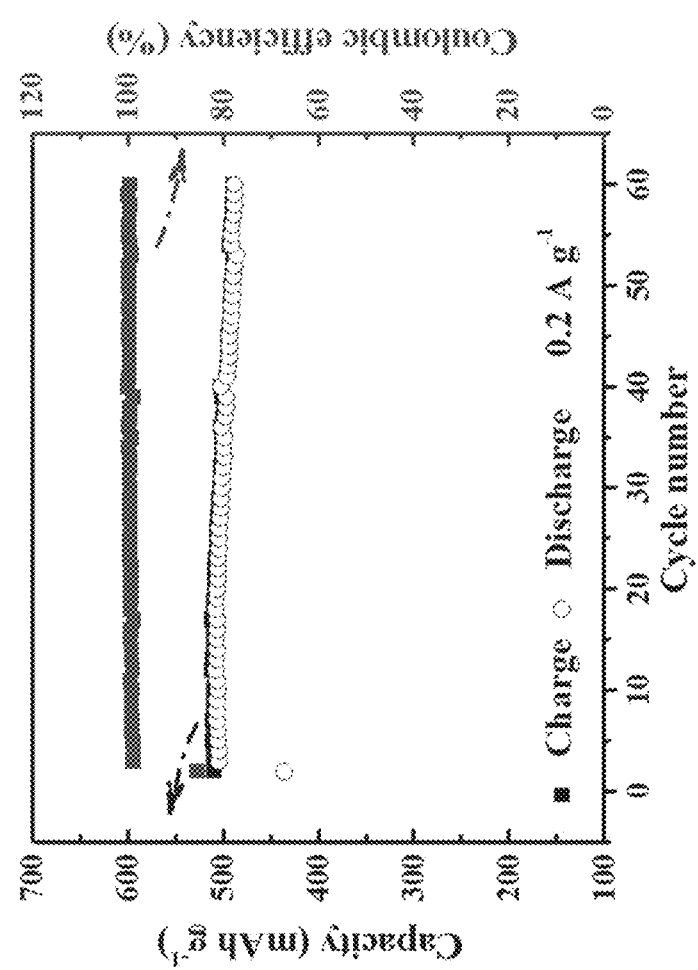
FIG. 7 is a plot showing the cycling performance and Coulombic efficiency of the $V_2CT_x$-based ZIB of FIG. 6A at 0.2 A g$^{-1}$.
Figure 8:
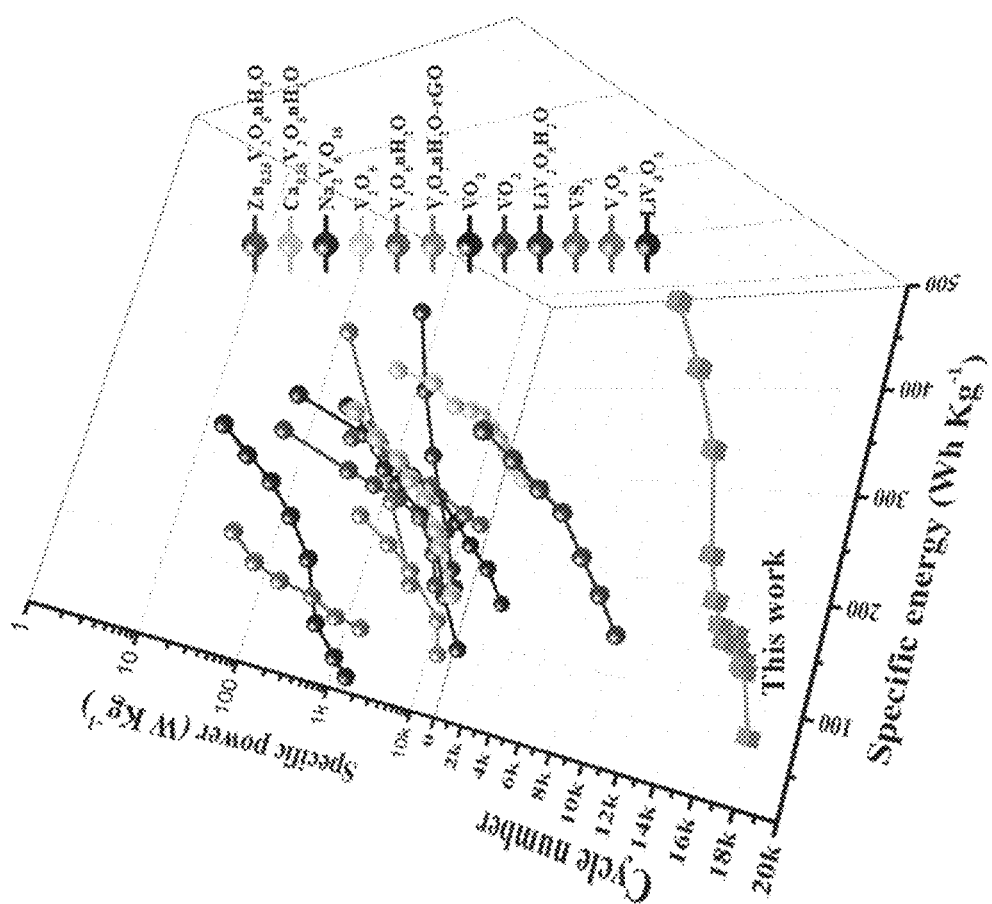
FIG. 8 is a three dimensional plot of power density against energy density against cycle life of different vanadium-based aqueous ZIBs.

Furthermore, the cycle performance of the $V_2CT_x$ cathode at a low current density of 0.2 A $g^{-1}$ exhibits a very impressive reversible capacity of 507.9 mAh $g^{-1}$ with a stable CE of about 100%, representing a significantly competitive electrochemical performance (FIG. 7). In addition, the power density, energy density and cycle performance of the $V_2CT_X$ cathode were compared with other vanadium-based ZIB such as $Zn_{0.25}V_2O_5 \cdot nH_2O$, $Ca_{0.25}V_2O_5 \cdot nH_2O$, $Na_2V_6O_{16}$, $V_2O_5$, $V_2O_5 \cdot nH_2O$, $V_3O_7 \cdot nH_2O/rGO$, $VO_2$, $LiV_2O_5 \cdot H_2O$, $VS_2$, $V_3O_8$, $LiV_3O_8$, etc. As shown in FIG. 8, among the tested batteries, the energy density of $V_2CT_x$-based ZIB is as high as 386.2 Wh $kg^{-1}$ at 0.2 A $g^{-1}$, while its power density reaches up to 10281.6 W $kg^{-1}$ at 20 A $g^{-1}$. More significantly, the ultra-long cycle performance of more than 18000 cycles at an extremely high current density of 10 A $g^{-1}$ and a wide voltage window of 0.1-2.0 V (to be discussed below) may be much more superior to other ZIB with similar configurations.

Figure 9:
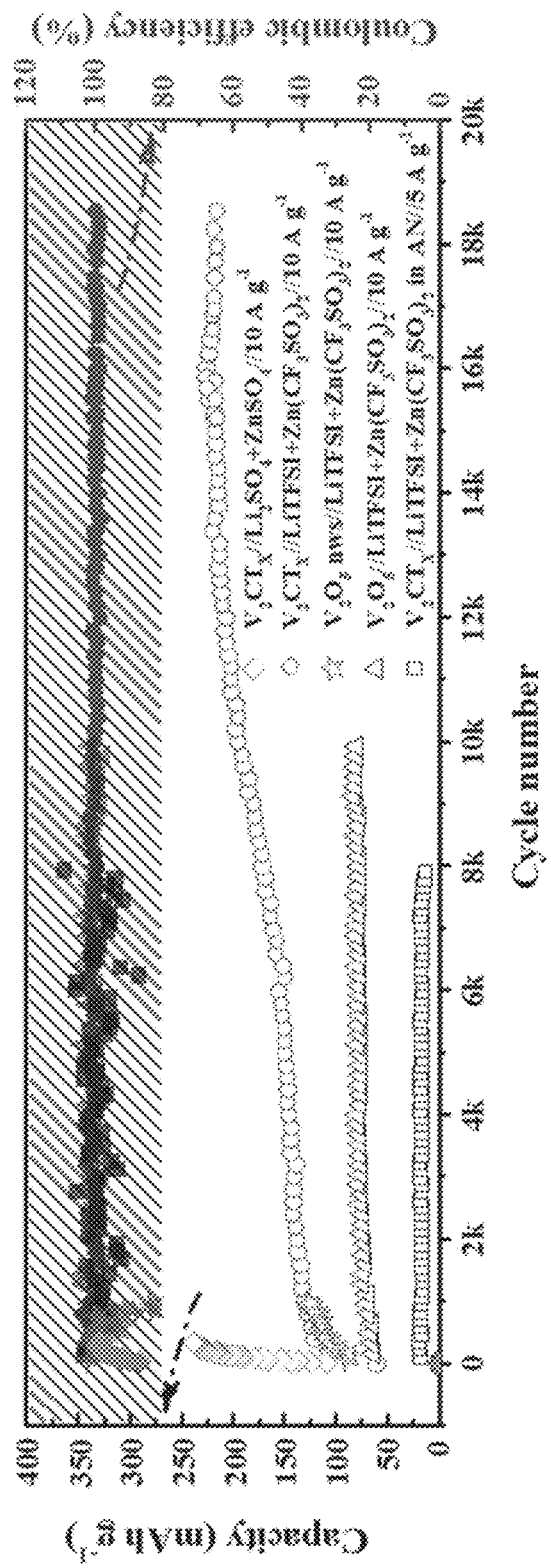
FIG. 9 is a plot showing the long-term cycling performance of the $V_2CT_x$-based ZIB of FIG. 6A and control samples at 10 A g$^{-1}$.

The prolonged cycle performance of the $V_2CT_x$-based ZIB at 10 A $g^{-1}$ is shown in FIG. 9. Notably, after a sharp rise in the first few hundred cycles, the increase in capacity tends to be flat but does not become saturated. After about 13000 cycles, the specific capacity reaches and stabilizes at around 202 mAh $g^{-1}$, and increases slightly during subsequent periods until the battery fails. It is interesting that capacity increases gradually with the cyclic processes with a stable CE of 100%, especially up to 18000 cycles, given the fact that capacity declination always accompanies with most ZIBs.

The cycle performance of the control samples is also shown in FIG. 9. The $V_2CT_x$ cathode in 1M $Li_2SO_4$+2M $ZnSO_4$ electrolyte displays a very short cycle life, less than 350 cycles, although its specific capacity can reach more than 200 mAh $g^{-1}$. Similarly, the cycle life of $V_2CT_X$ cathode in an organic electrolyte (LiTFSI+$Zn(CF_3SO_3)_2$ in acetonitrile) has been improved, but its specific capacity is extremely low, less than 25 mAh $g^{-1}$, even at a lower current density of 5 A $g^{-1}$. Interestingly, except for the beginning of the cycle, there was no significant increase in capacity during the subsequent periods, which justifies the critical role of water in the electrolyte in the capacity's increase. On the other hand, the specific capacity of both $V_2O_5$ particles and nanowires cathodes are much lower than $V_2CT_X$ under the same condition, and there is no increase in capacity during the whole cyclic processes (FIG. 9).

The in-situ cyclic voltammogram (CV) curves performed at a scan rate of 2 mV $s^{-1}$ in the potential range of 0.1-2.0 V (versus $Zn^{2+}$/Zn) are shown in FIG. 10A. As the number of scans increases, the CV curves show an upward trend rather than overlapping with each other, suggesting that a capacity enhancement, which is consistent with the prolonged cycle curve. This is further supported by the larger area under the CV curve of 18000 cycles at 10 A $g^{-1}$.

More importantly, enhanced broad redox peaks at around 1.09/1.32 V indicate the improved pseudocapacitive behavior, which is caused the stripping of $V_2CT_x$ MXene. As the cycle progresses, the above peaks are gradually covered up by the generated redox peaks at around 0.86/1.16 V, representing the $V_2O_5$ phase. In addition, the CV curves at different scan rates ranging from 0.5-10 mV $s^{-1}$ and the corresponding linear fitting curves of log(i) vs log(v) were given in FIG. 10B. And the b values (as shown in FIG. 10C), which were collected and calculated at different voltage points, means that the Zn ions storage mechanism of the $V_2CT_x$ cathode was controlled by the dual-models of capacitive and diffusion.

Figure 11:
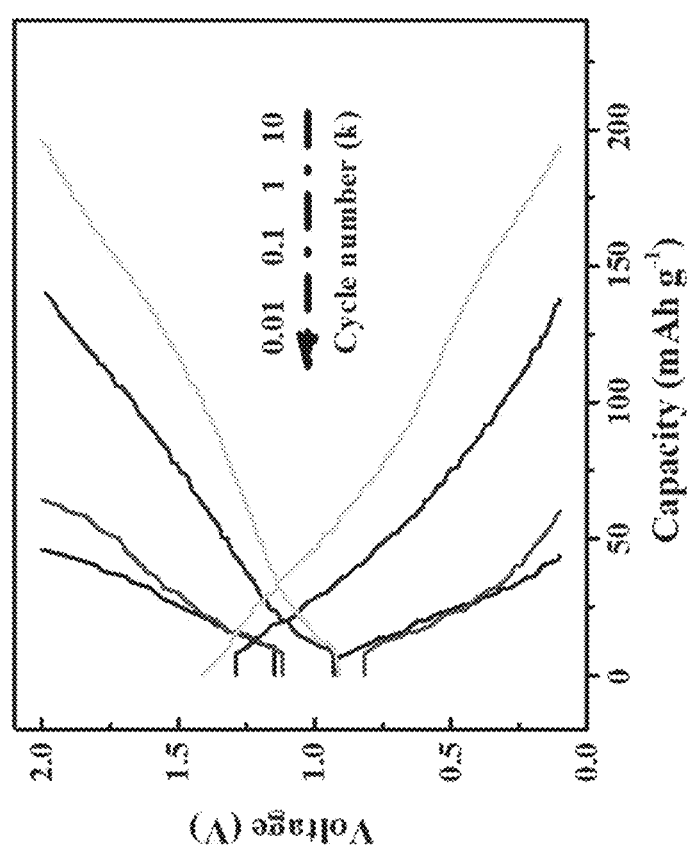
FIG. 11 is a plot of voltage against capacity showing the discharge/charge curves of the $V_2CT_x$-based ZIB of FIG. 6A at different stages.

FIG. 11 gives the discharge/charge curves of $V_2CT_x$-based ZIB at different cycle stages. As the cycle progresses, the curve gradually flattens out with the appearance of inflection point at around 0.7 V, which is caused by the generation of $V_2O_5$ phase.

Figure 13:
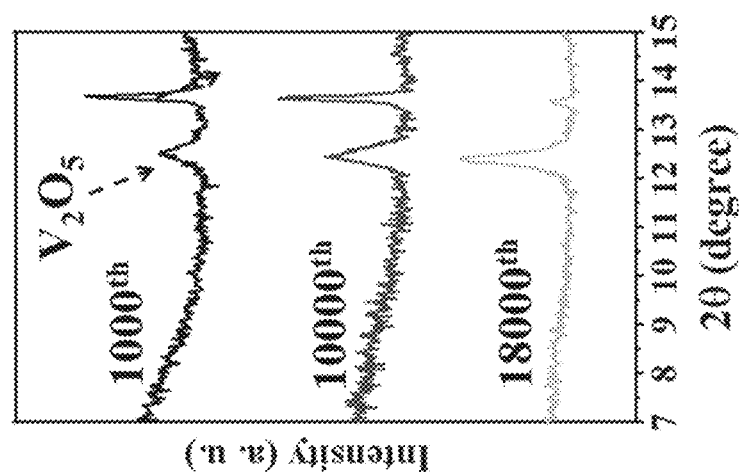
FIG. 13 is a plot showing the XRD pattern of the $V_2CT_x$ cathode after more than 1000th cycles at 10 A g$^{-1}$. The $V_2CT_x$ cathode is in the state of being charged to 0.2 V.
Figure 14E:
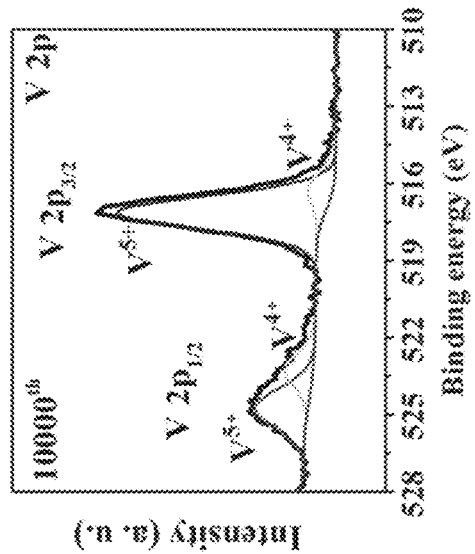
FIG. 14E is a plot showing the XPS V 2p patterns of the $V_2CT_x$ cathode after more than 10000th cycle at 10 A g$^{-1}$. The $V_2CT_x$ cathode is in the state of being charged to 0.2 V.
Figure 14F:
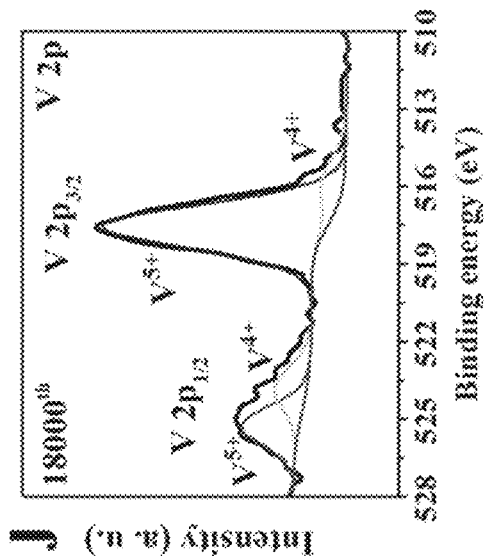
FIG. 14F is a plot showing the XPS V 2p patterns of the $V_2CT_x$ cathode after more than 18000th cycle at 10 A g$^{-1}$. The $V_2CT_x$ cathode is in the state of being charged to 0.2 V.
Figure 14D:
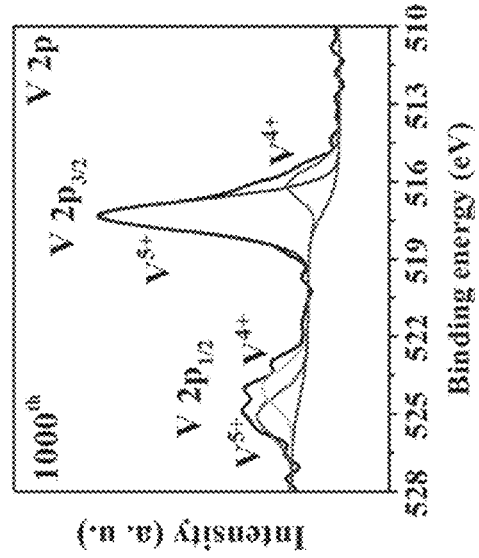
FIG. 14D is a plot showing the XPS V 2p patterns of the $V_2CT_x$ cathode after more than 1000th cycle at 10 A g$^{-1}$. The $V_2CT_x$ cathode is in the state of being charged to 0.2 V.

To reveal the underlying mechanism of the unusual capacity enhancement of the $V_2CT_X$ cathode, ex-situ XRD and XPS were measured, as shown in FIGS. 12 to 14. FIG. 12A shows a discharge/charge curve of the $V_2CT_X$ cathode of the 3rd cycle at a low current density of 0.1 A $g^{-1}$. Each marked point on the curve corresponds to the XRD pattern as shown in FIGS. 12B and 12C. The voltage positions taken in the 1st cycle is the same as the 3rd cycle.

As compared to pristine $V_2CT_x$ cathode before cycling, the leftward shift of the peak at around 2θ=8.92°, which represents the (002) lattice plane, indicates the intercalation of $Zn^{2+}$ during the discharging process and results in an irreversible increase in the layer spacing of layered $V_2CT_X$ (FIG. 12B). The appearance of a new peak at 2θ=7.85° may be attributed to the delaminated $V_2CT_X$ flakes resulting from particles peeling off during cycles, as depicted in FIG. 12C. The stripping of the layered materials can significantly increase the active sites in cathodes and thereby improve the capacity. Moreover, this structural transition will continue to occur as the cycle progresses. This unique feature can partially explain the capacity enhancement of the $V_2CT_X$ cathode during prolonged cycles.

Nonetheless, the observed capacity improvement was very remarkable and the duration is unprecedent, it is believed that cathode stripping is not the dominated mechanism of capacity enhancement. Detailed observation to the XRD patterns after many discharge/charge cycles (FIG. 13) reveals another new peak at around 2θ=12.46°, which can be attributed to the (100) plane of $V_2O_5$ phase (JCPDS 53-0538). The intensity of the peak at 2θ=12.46° gradually increases as the cycle progresses and meanwhile, the adjacent peak at 2θ=7.85° and 8.92° corresponding to (002) lattice of $V_2CT_X$ gets weaker gradually, indicating a phase transition of the $V_2CT_X$ to $V_2O_5$.

To further verify our observation, valence state variation of the V elements in the $V_2CT_X$ cathode were investigated by XPS upon the cycle process. The fitting peaks of V 2p in $V_2CT_X$ before and after different cycles (1st, 3rd, 1000th+, 10000th+, 18000th+) in the state of being charged to 0.2 V are shown in FIGS. 14A to 14F. After the first cycle, the coexistence of $V^{2+}$ at 521.4 and 513.7 eV and $V^{4+}$ at 524.2 and 516.7 eV in $V_2CT_X$ transfers to the mixture of $V^{2+}$ (521.7 and 514.1 eV), $V^{4+}$ (524.5 and 516.2 eV), $V^{5+}$ (517.3 eV). The transition of V elements from a low valence state to high valence state is strengthened as the cycle progresses. With the gradual weakening and disappearing of $V^{2+}$ peaks, only $V^{4+}$ (523.8 and 516.9 eV) and $V^{5+}$ (525.3 and 517.7 eV) remain in the $V_2CT_X$ cathode, which echoed the XRD pattern.

The SEM and TEM images shown in FIGS. 15 to 17 provide more insights into the structural and phase transitions. As shown in FIG. 15B, the particle surface still remains smooth and clean without any visible impurities after the first cycle, which is similar to the original $V_2CT_X$ MXenes as shown in FIG. 15A. However, some stacked few-layered $V_2CT_X$ flakes appear after three cycles (FIG. 15C), and the structural transition is also confirmed by TEM image (FIG. 15D). The presence of many dark spotty regions with uneven distribution on the flakes suggests the phase transition and the generation of $V_2O_5$, differing from the transparent morphology of pristine $V_2CT_X$ as shown in FIG. 15E.

Figure 15A:
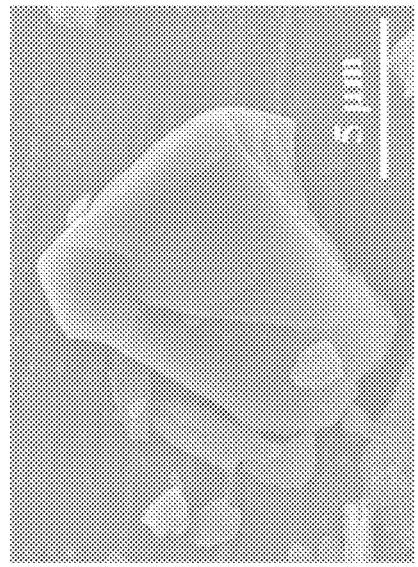
FIG. 15A is a SEM image of the $V_2CT_x$ cathode before cycling.
Figure 15B:
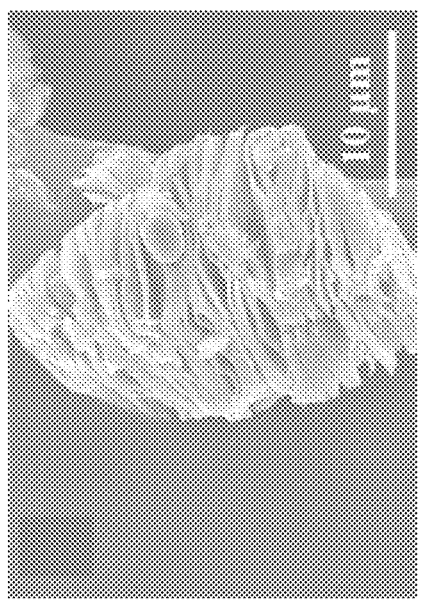
FIG. 15B is a SEM image of the $V_2CT_x$ cathode after the 1st cycle at 0.1 A g$^{-1}$.
Figure 15C:
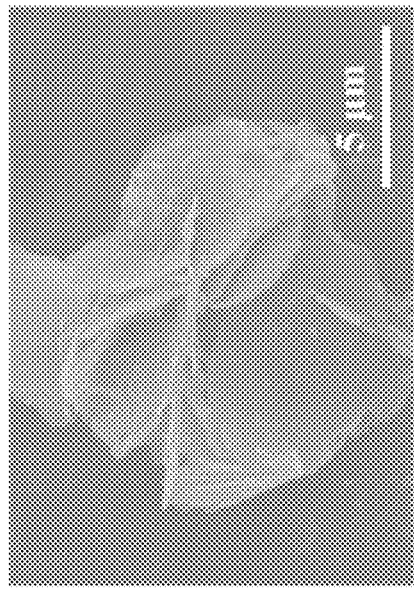
FIG. 15C is a SEM image of the $V_2CT_x$ cathode after the 3rd cycle at 0.1 A g$^{-1}$.
Figure 15D:
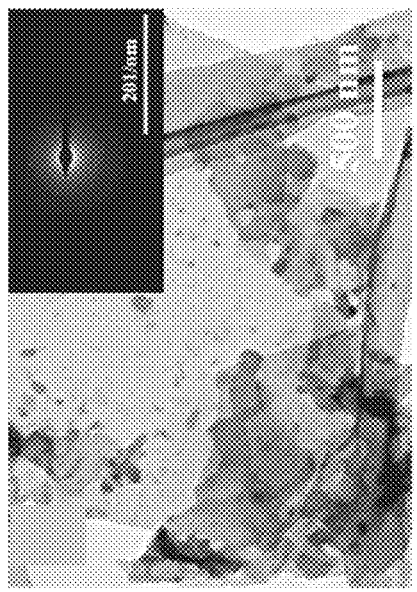
FIG. 15D is a TEM image of the $V_2CT_x$ cathode after the 3rd cycle at 0.1 A g$^{-1}$. The insert is the SAED patterns of the $V_2CT_x$ cathode.
Figure 15E:
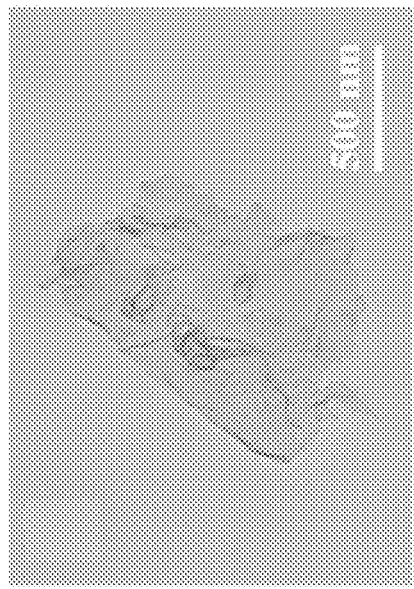
FIG. 15E is a TEM image of the $V_2CT_x$ cathode before cycling.
Figure 16A:
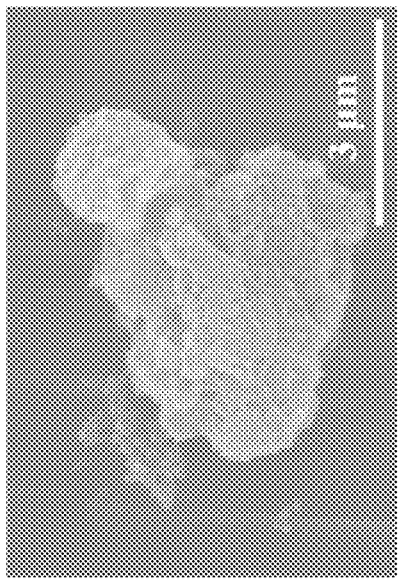
FIG. 16A is a SEM image of the $V_2CT_x$ cathode after more than 1000th cycle at 10 A g$^{-1}$.
Figure 16B:
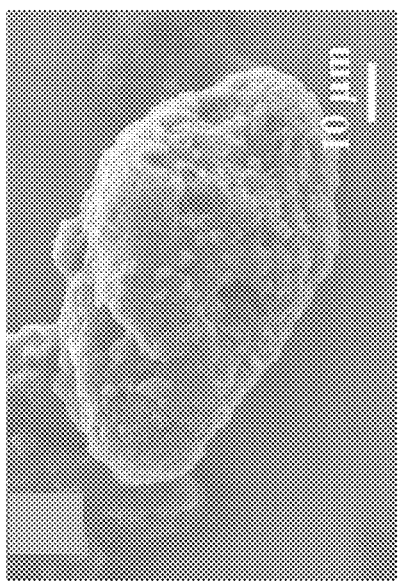
FIG. 16B is a SEM image of the $V_2CT_x$ cathode after more than 10000th cycle at 10 A g$^{-1}$.
Figure 16C:
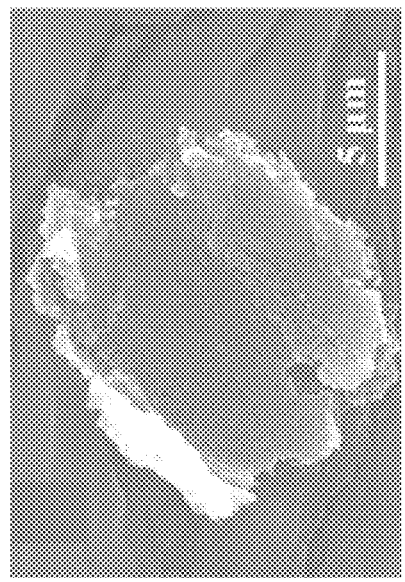
FIG. 16C is a SEM image of the $V_2CT_x$ cathode after more than 18000th cycle at 10 A g$^{-1}$.

In addition, SAED pattern consisting of an original regular hexagonal lattice of $V_2CT_X$ and the new polycrystalline lattice of $V_2O_5$ are observed (the insert in FIG. 15D). Moreover, the $V_2CT_X$ morphology changes significantly, and the smooth surface becomes rough, coupled with obvious and dense granular products when the cycle number reaches thousands or more (FIGS. 16A to 16C). Original intact $V_2CT_X$ flakes break up into smaller pieces after about 18000 cycles, as shown in FIG. 17A.

Figure 17B:
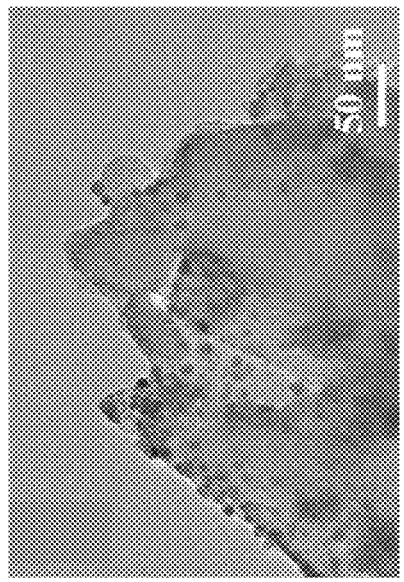
FIG. 17B is a HRTEM image of the $V_2CT_x$ cathode after more than 10000th cycle at 10 A g$^{-1}$.
Figure 17D:
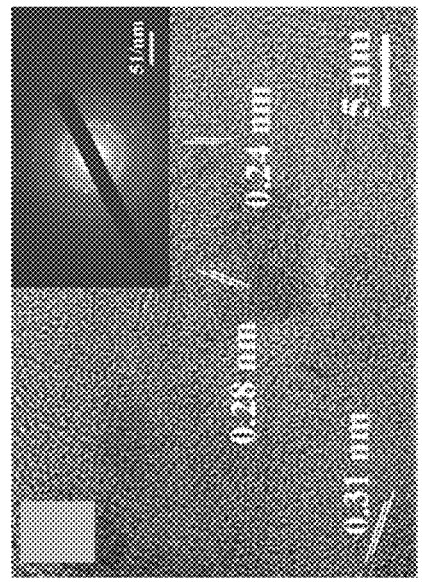
FIG. 17D is a HRTEM image of the $V_2CT_x$ cathode after more than 18000th cycle at 10 A g$^{-1}$. The insert is the SAED patterns of the $V_2CT_x$ cathode.
Figure 17A:
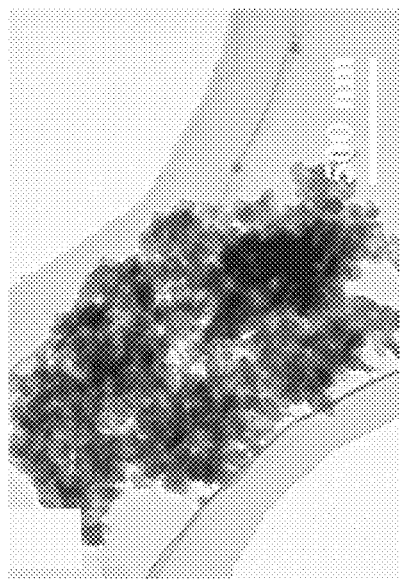
FIG. 17A is a TEM image of the $V_2CT_x$ cathode after more than 18000th cycle at 10 A g$^{-1}$.
Figure 17C:
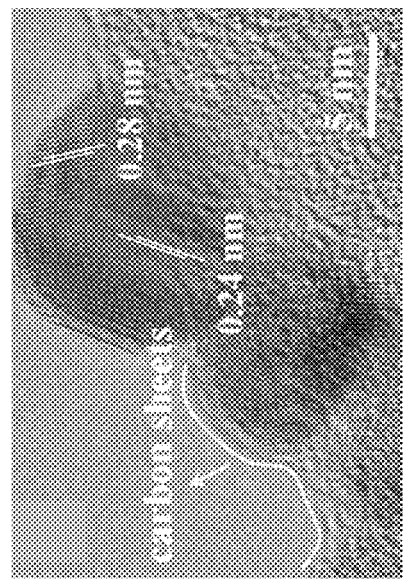
FIG. 17C is a HRTEM image of the $V_2CT_x$ cathode after more than 18000th cycle at 10 A g$^{-1}$.

It can be clearly seen from FIGS. 17B to 17D that the resulting $V_2O_5$ particles with a particle size of 5-10 nm are evenly distributed inside the flakes and the edges. Furthermore, at this stage, the dominant polycrystalline lattice is much stronger than the hexagonal lattice of $V_2CT_X$, and diffraction halo originating in carbon phase appears (FIG. 17D). The lattice fringes with different d-spacing of about 0.24, 0.28, 0.31 nm, which correspond to the (300), (111) and (210) planes of $V_2O_5$, respectively, as shown in the high-resolution TEM images (FIGS. 17B and 17C), matching the XRD and XPS results well. The flexible, wrinkled 2D carbon sheets around the $V_2O_5$ particle are also observed (FIG. 17C).

Figure 18:
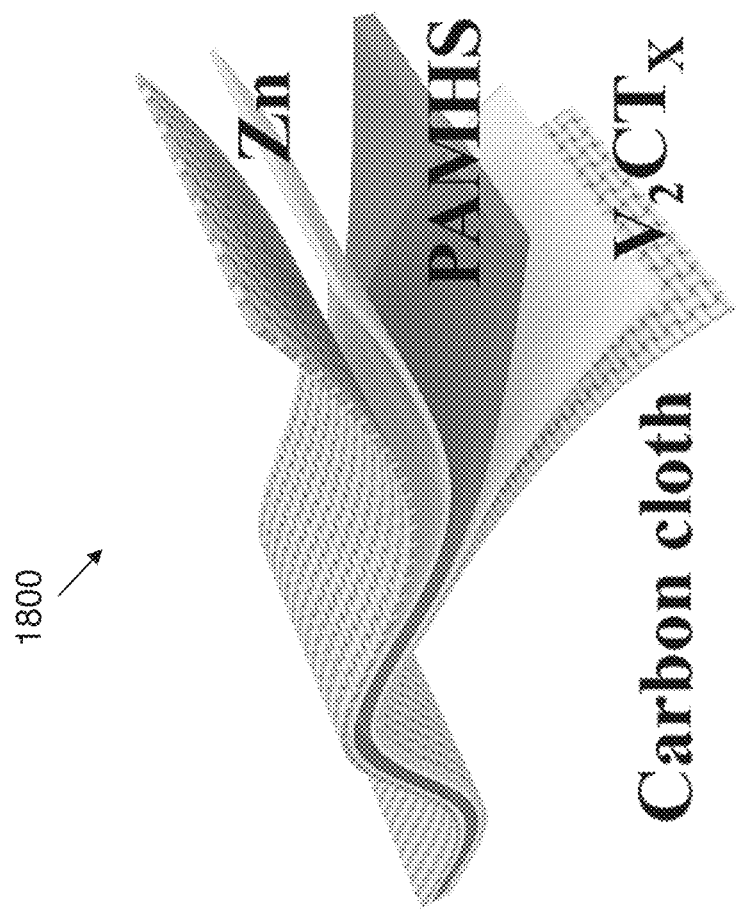
FIG. 18 is a schematic representation of a Zn—$V_2CT_x$ battery in accordance with one embodiment of the present invention.
Figure 19A:
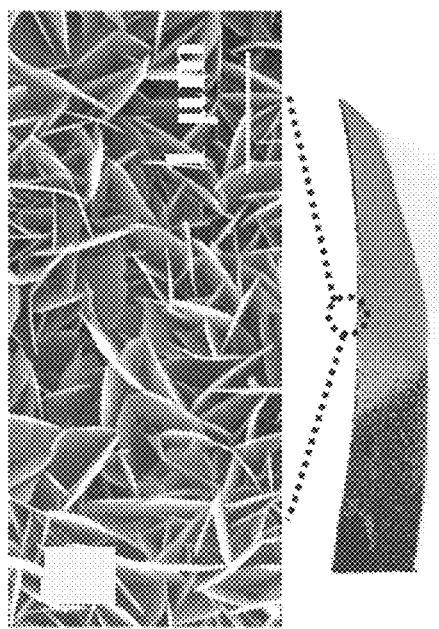
FIG. 19A is a SEM image and an optical photo of the flexible zinc anode.
Figure 19B:
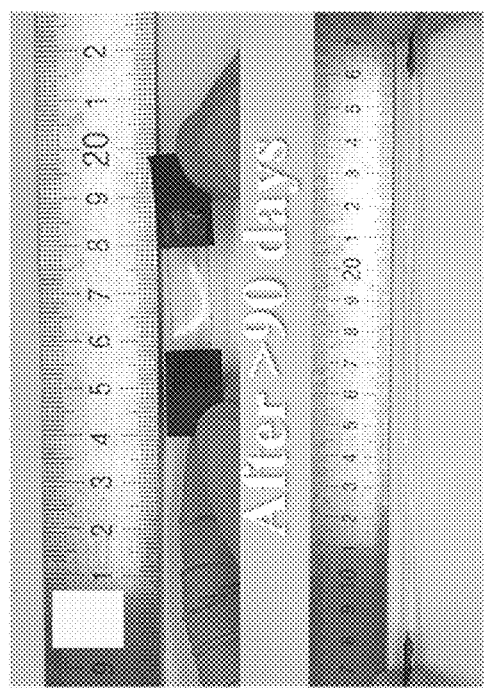
FIG. 19B is an optical photo showing the PAM-based hydrogel before and after being placed in the air for more than 60 days.
Figure 20A:
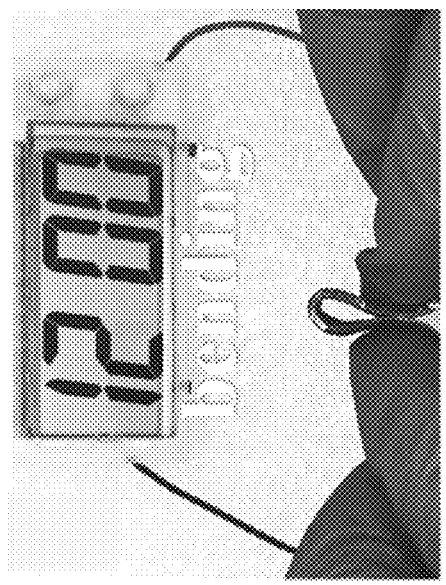
FIG. 20A is an optical image showing the Zn—$V_2CT_x$ battery of FIG. 18 being bent at 180° while powering a timer.
Figure 20B:
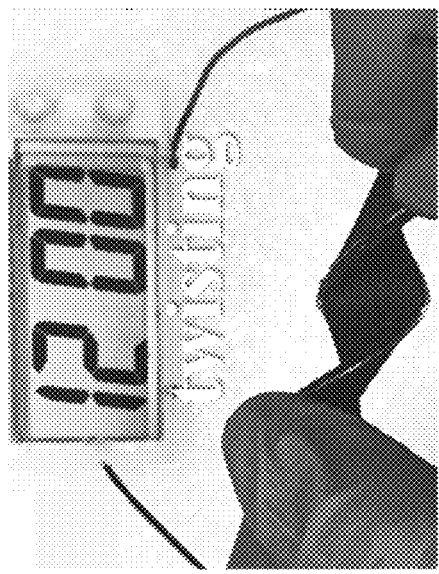
FIG. 20B is an optical image showing the Zn—$V_2CT_x$ battery of FIG. 18 being twisted at 360° while powering a timer.
Figure 20C:
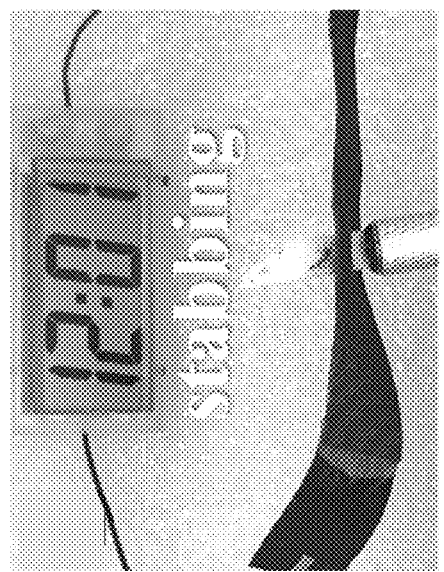
FIG. 20C is an optical image showing the Zn—$V_2CT_x$ battery of FIG. 18 being stabbed by a cutter while powering a timer.
Figure 20D:
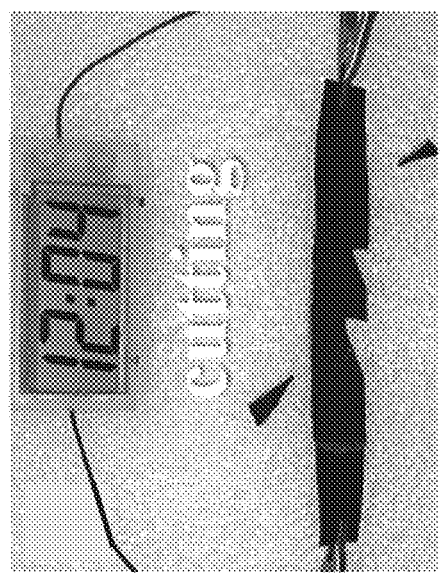
FIG. 20D is an optical image showing the Zn—$V_2CT_x$ battery of FIG. 18 being cut while powering a timer.

A flexible solid-state ZIB 1800 consisting of a flexible Zn anode, a PAM-based hydrogel electrolyte, and a $V_2CT_x$ cathode was assembled (FIG. 18). The metal Zn prepared by electrodeposition exhibits a laminated structure and is uniformly arranged vertically on the carbon cloth substrate (FIG. 19A). Meanwhile, the obtained anode inherits the flexibility of the carbon cloth. Also, the PAM hydrogel electrolyte also possesses excellent flexibility and adhesion, which can be stretched to ten times longer than the original length without shedding off after being simply attached to the electrodes, even in the severe case of being twisted 360° (FIG. 19B). Of particular note is that the mechanical properties of the PAM hydrogel electrolyte are almost unchanged after being left in the open-air environment for more than 60 days at room temperature, which greatly simplifies the assembly process and ensures the stability of the solid ZIB.

Figure 21B:
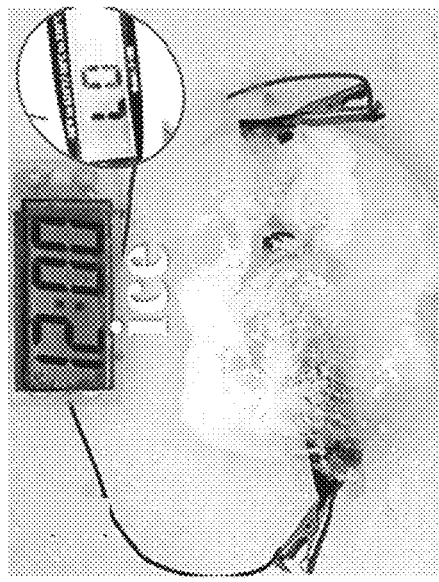
FIG. 21B is an optical image showing the Zn—$V_2CT_x$ battery of FIG. 18 being placed in ice with a temperature of less than −20° C. while powering a timer.
Figure 21D:
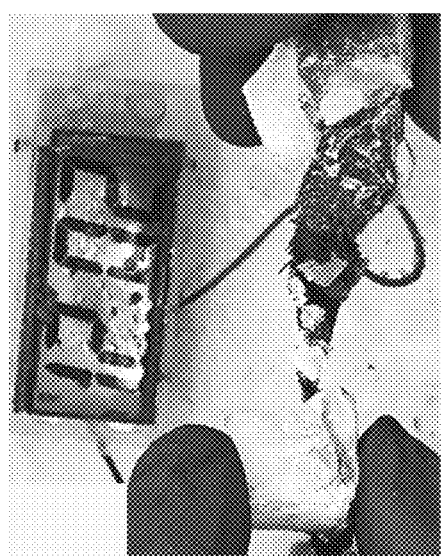
FIG. 21D is an optical image showing the Zn—$V_2CT_x$ battery of FIG. 18 being placed in ice with a temperature of less than −20° C. and being twisted at 360° while powering a timer.
Figure 21A:
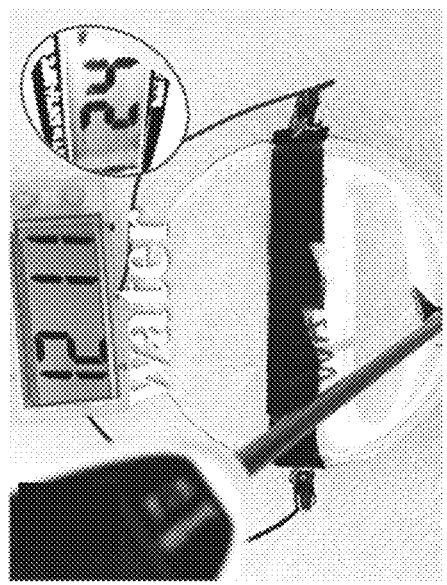
FIG. 21A is an optical image showing the Zn—$V_2CT_x$ battery of FIG. 18 being placed in a glass of water with room temperature while powering a timer.
Figure 21C:
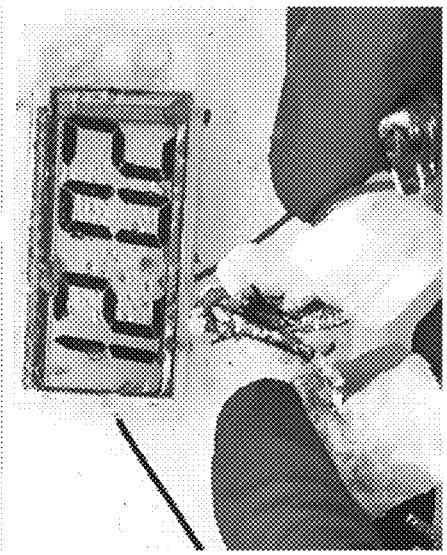
FIG. 21C is an optical image showing the Zn—$V_2CT_x$ battery of FIG. 18 being placed in ice with a temperature of less than −20° C. and being bent at 180° while powering a timer.

Furthermore, the ZIB 1800 is highly flexible and tough and can work stably in bending and twisting at different angles, stabbing, and cutting conditions (FIGS. 20A to 20D). More importantly, the PAM hydrogel electrolyte possesses excellent weather resistance. For example, the solid-state ZIB is able to work stably and maintain the flexibility in both water and ice at an extremely low temperature (<-20° C.) (FIGS. 21A and 21B). In addition, the ZIB is still operable even being bent or twisted at different angles under the extremely low temperature (FIGS. 21C and 21D). All these results indicate the excellent weather resistance of the battery. All the features mentioned above are critical to the practical application.

Figure 23:
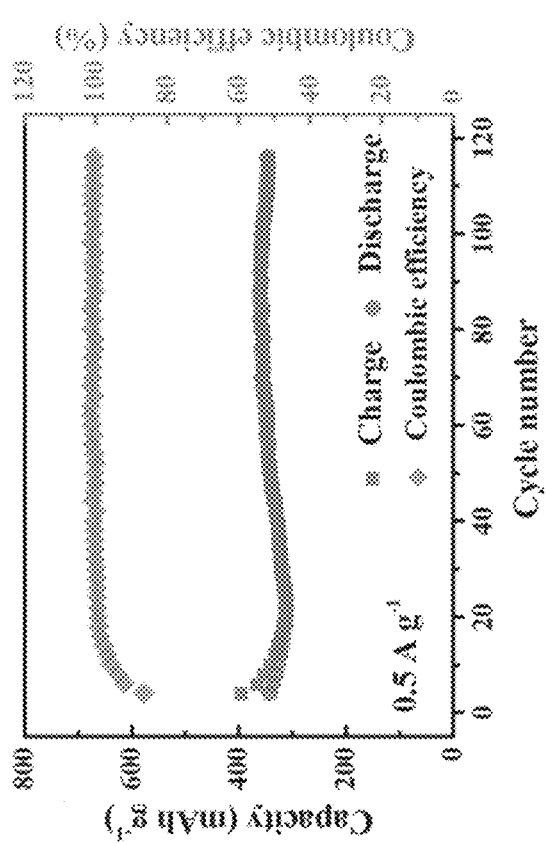
FIG. 23 is a plot showing the cycling performance and Coulombic efficiency of the Zn—$V_2CT_x$ battery of FIG. 18 at 0.5 A g$^{-1}$.

The capacity retention rate of the solid ZIB 1800 at different temperatures ranging from 30 to -20° C. is shown in FIG. 22A, with the specific capacity at 30° C. is set as the benchmark. It is clear from the cycle curve that the ZIB 1800 can adapt very quickly to the changing temperature and stabilize the output and keep the CE of 100%. The decreased capacity at low temperature is mainly attributed to the weakened ionic conductivity in the gel electrolyte, as shown in FIG. 22B. In addition to the safety and weather resistance, the flexible solid-state ZIB based on $V_2CT_X$ cathode possesses a high specific capacity of up to 360.8 mAh $g^{-1}$ at 0.5 A $g^{-1}$, showing great potentials in wearable electronics fields (FIG. 23).

The energy storage device of the present invention such as the aforementioned Zn—$V_2CT_x$ battery is advantageous since it possesses excellent electrochemical properties. For example, the battery has a high capacity of 508 mAh $g^{-1}$ at 0.2 A $g^{-1}$; and a stable discharge-charge cycling performance over 18000 cycles. The battery also has an ultrahigh power density of 386.2 Wh $kg^{-1}$ and energy density of 10281.6 W $kg^{-1}$. All these features indicate the potential use of the battery in meeting the demanding power supply and charging/discharging requirements in multifunctional electronics and electric vehicles.

In addition, the battery of the present invention is capable of maintaining its electrochemical performance upon subjecting to external mechanical loads (e.g. bending, twisting, cutting, etc.) and/or under an extremely low temperature such as -20° C. These features also increase the durability and applicability of the battery in different scenarios. Furthermore, the scaling up of the device is very cost effective and simple as it does not require a water-free and/or oxygen-free environment for assembling the battery.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An energy storage device, comprising:
    a cathode comprising a carbon cloth, the carbon cloth comprising an active material deposited thereupon, the active material comprising a material structure of vanadium carbide MXenes;
    an anode comprising a carbon cloth, the carbon cloth comprising zinc being deposited thereupon; and
    a gelatin-based electrolyte comprising an aqueous electrolytic solution that is in electrical communication with the cathode and the anode;
    wherein the gelatin-based electrolyte comprises a polyacrylamide hydrogel, and wherein the aqueous electrolytic solution comprises a high concentration salt solution containing a total concentration from about 5 M to about 21 M of metal ions; and wherein the energy storage device increases capacity upon the operation cycle of charging and discharging.

2. The energy storage device according to claim 1, wherein the vanadium carbide MXenes material structure comprises a plurality of active sites during the operation cycle of charging and discharging of the energy storage device.

3. The energy storage device according to claim 2, wherein the vanadium carbide MXenes material structure comprises interlayer spacings, and wherein the vanadium carbide MXenes material undergoes a structural change upon an ion insertion into the interlayer spacings.

4. The energy storage device according to claim 3, wherein the vanadium carbide MXenes structure undergoes delamination, forms a plurality of layers of the active material, and provides an increased number of active sites, thereby facilitating further ion insertion.

5. The energy storage device according to claim 3, wherein the ions inserted into the interlayer spacings of the vanadium carbide MXenes material structure comprises the metal ions.

6. The energy storage device according to claim 5, wherein the metal ions are selected from the group consisting of $Li^+$, $Na^+$, $Ca^{2+}$, $Mg^{2+}$, $Zn^{2+}$, $Al^{3+}$, $Fe^{2+}$, and the combination thereof.

7. The energy storage device according to claim 1, wherein the vanadium carbide MXenes material structure undergoes a phase transition to form at least a partial oxide of the active material.

8. The energy storage device according to claim 7, wherein the oxide of the active material comprises $V_2O_5$.

9. The energy storage device according to claim 1, wherein the vanadium carbide MXenes material structure undergoes a phase transition thereby forming at least a partial carbon phase of the active material.

10. The energy storage device according to claim 1, wherein the material structure of the vanadium carbide MXenes comprises a plurality of layers of $V_2CT_x$ comprising vanadium carbide and a plurality of surface terminal functional groups, wherein x is any number.

11. The energy storage device according to claim 6, wherein the high concentration salt solution prevents dissolution of the active material, thereby maintaining the structure of the active material for the physical and/or a chemical transformation.

12. The energy storage device according to claim 1, wherein the gelatin-based electrolyte physically deforms upon application of an external mechanical force to the electrolyte.

13. The energy storage device according to claim 1, wherein the gelatin-based electrolyte is operable under water and/or at about −20° C.

14. The energy storage device according to claim 1, wherein the gelatin-based electrolyte maintains its mechanical properties after subjection to an open-air environment for at least about 60 days.

15. The energy storage device according to claim 1, wherein the aqueous electrolytic solution comprises from about 5 M to about 21 M of LiTFSI and from about 0.1 M to about 3 M of $Zn(CF_3SO_3)_2$.

16. A method of preparing an energy storage device, comprising the steps of:
providing an anode comprising a carbon cloth, the carbon cloth comprising zinc being deposited thereupon;
providing a cathode comprising a carbon cloth, the carbon cloth comprising an active material deposited thereupon, the active material comprising a material structure of vanadium carbide MXenes;
providing a gelatin-based electrolyte comprising an aqueous electrolytic solution that is in electrical communication with the cathode and the anode, wherein the gelatin-based electrolyte comprises a hydrogel of polyacrylamide, and wherein the aqueous electrolytic solution comprises a high concentration salt solution containing a total concentration from about 5 M to about 21 M of metal ions; and
sandwiching the gelatin-based electrolyte between the anode and the cathode;
wherein the energy storage device increases capacity upon the operation cycle of charging and discharging.

17. The method of preparing an energy storage device according to claim 16, wherein providing a zinc anode includes the step of electrodepositing a zinc metal onto a substrate.

18. The method of preparing an energy storage device according to claim 16, wherein providing a cathode including the steps of:
chemically etching a precursor of the active material at room temperature or an elevated temperature for a predetermined time period to obtain the active material;
forming a slurry of the active material; and
depositing a layer of the slurry on the carbon cloth.

19. The method of preparing an energy storage device according to claim 18, wherein the precursor material of the active material includes a precursor of $V_2CT_x$, comprising vanadium carbide and a plurality of surface terminal functional groups, wherein x is any number or value.

20. The method of preparing an energy storage device according to claim 16, wherein providing a gelatin-based electrolyte includes the steps of:
forming a mixture of a gel monomer, an initiator and a crosslinking agent in an aqueous electrolytic solution; and
curing the mixture at room temperature or a higher temperature.

21. The method of preparing an energy storage device according to claim 20, wherein the gel monomer is provided with an amount of 2 wt % to 50 wt % based on a total amount of the gelatin-based electrolyte.

22. The method of preparing an energy storage device according to claim 21, wherein the initiator is provided with an amount of 0.1 wt % to 10 wt % based on a total amount of the gelatin-based electrolyte.

23. The method of preparing an energy storage device according to claim 21, wherein the crosslinking agent is provided with an amount of 0.002 wt % to 0.2 wt % based on a total amount of the gelatin-based electrolyte.

* * * * *